(12) United States Patent
Kamo et al.

(10) Patent No.: US 9,362,539 B2
(45) Date of Patent: Jun. 7, 2016

(54) POLYETHYLENE POWDER, MICROPOROUS MEMBRANE, AND FIBER

(71) Applicant: Asahi Kasei Chemicals Corporation, Tokyo (JP)

(72) Inventors: Hiroshi Kamo, Tokyo (JP); Akio Fujiwara, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 0 days.

(21) Appl. No.: 14/635,417

(22) Filed: Mar. 2, 2015

(65) Prior Publication Data
US 2015/0249242 A1    Sep. 3, 2015

(30) Foreign Application Priority Data

Mar. 3, 2014  (JP) ................. 2014-040698

(51) Int. Cl.
| | | |
|---|---|---|
| *C08F 2/00* | (2006.01) | |
| *C08F 110/02* | (2006.01) | |
| *H01M 2/16* | (2006.01) | |
| *D01F 6/04* | (2006.01) | |

(52) U.S. Cl.
CPC ............. *H01M 2/162* (2013.01); *C08F 110/02* (2013.01); *D01F 6/04* (2013.01); *H01M 2/1653* (2013.01)

(58) Field of Classification Search
CPC ....... H01M 2/162; H01M 2/1653; D01F 6/04; C08F 110/02
USPC ................................. 526/194, 352
See application file for complete search history.

(56) References Cited

U.S. PATENT DOCUMENTS

| | | | | |
|---|---|---|---|---|
| 3,799,811 A | * | 3/1974 | Sampson et al. ........ | H01M 4/86 428/297.4 |
| 2011/0196114 A1 | * | 8/2011 | Le .......................... | C08F 210/16 526/75 |
| 2011/0311878 A1 | | 12/2011 | Inagaki et al. | |
| 2011/0313071 A1 | | 12/2011 | Wang et al. | |
| 2013/0046040 A1 | | 2/2013 | Srinivasan et al. | |

FOREIGN PATENT DOCUMENTS

| | | |
|---|---|---|
| JP | H07-224115 A | 8/1995 |
| JP | 2001-114838 A | 4/2001 |
| JP | 2008-501850 A | 1/2008 |
| JP | 2010-235926 A | 10/2010 |
| JP | 2011-074119 A | 4/2011 |
| JP | 4822567 B2 | 9/2011 |
| JP | 2011-233542 A | 11/2011 |
| JP | 2012-025817 A | 2/2012 |
| JP | 2012-229417 A | 11/2012 |
| JP | 2013-531083 A | 8/2013 |

* cited by examiner

*Primary Examiner* — William Cheung
(74) *Attorney, Agent, or Firm* — Morgan, Lewis & Bockius LLP

(57) ABSTRACT

It is intended to provide a polyethylene powder which can offer a fiber excellent in resistance to end breakage, dimensional stability, and acid resistance and/or a microporous membrane excellent in dimensional stability and acid resistance, and a microporous membrane and a fiber which are obtained by forming the polyethylene powder. The present invention provides a polyethylene powder comprising: 0.5 ppm or higher and 3,000 ppm or lower of aluminum hydroxide having an average particle size smaller than 50 μm; and 0.5 ppm or higher and 12 ppm or lower of a magnesium element, wherein the polyethylene has a viscosity-average molecular weight of 100,000 or larger.

20 Claims, No Drawings

POLYETHYLENE POWDER, MICROPOROUS MEMBRANE, AND FIBER

TECHNICAL FIELD

The present invention relates to a polyethylene powder, a microporous membrane, and a fiber.

DESCRIPTION OF THE RELATED ART

Background Art

Polyethylenes are used as raw materials for various products such as films, sheets, microporous membranes, fibers, foams, and pipes.

Among the polyethylenes, particularly, high-molecular-weight polyethylenes are suitably used as raw materials for microporous membranes for separators of secondary batteries typified by lead storage batteries and lithium ion batteries and as raw materials for fibers, because of their high drawing workability, mechanical strength, and chemical stability as well as excellent long-term stability of physical properties.

Since such high-molecular-weight polyethylenes have high melt viscosity and are difficult to process by injection molding or the like, these polyethylenes are often molded after dissolution in solvents. In this process, a portion of the polyethylenes may generate foreign matter composed of polyethylene gels without being dissolved. This disadvantageously reduces the productivity of continuous processing (which means that the foreign matter does not vary processing conditions so that the molding process can be achieved stably for a long time) or reduces the quality of the resulting microporous membranes and fibers.

In recent years, there have been significantly growing demands, particularly, for microporous membranes for secondary battery separators and fibers. Thus, products having higher quality have been desired. Specifically, products excellent in the productivity of continuous processing as well as acid resistance and dimensional stability are required as secondary battery separators. Also, products excellent in the productivity of continuous processing as well as resistance to end breakage during processing, dimensional stability, and acid resistance are required as fibers.

Microporous membranes which contain a small amount of foreign matter (polyolefin gels) and have improved characteristics as batteries have previously been disclosed as microporous membranes with polyolefins as raw materials (e.g., Patent Literature 1 to 3).

Japanese Patent Laid-Open No. 2011-233542 describes a microporous membrane made of a polyethylene, wherein the content of aluminum is 70 ppm or lower. The literature discloses that this technique reduces foreign matter in the membrane and improves the cycling characteristics of batteries.

Japanese Patent No. 4822567 describes a microporous membrane made of a polyolefin containing a specific amount of a polyethylene produced with an organic aluminum compound as a promoter. The literature discloses that this technique reduces foreign matter in the membrane and improves the cycling characteristics of batteries.

Japanese Patent Laid-Open No. 2011-74119 describes a method for producing a microporous membrane made of a polyolefin, wherein the content of aluminum occupying the polyolefin composition is 20 ppm or lower. The literature discloses that this technique reduces foreign matter in the membrane and improves the cycling characteristics of batteries.

CITATION LIST

Patent Literature

Patent Literature 1: Japanese Patent Laid-Open No. 2011-233542
Patent Literature 2: Japanese Patent No. 4822567
Patent Literature 3: Japanese Patent Laid-Open No. 2011-74119

SUMMARY OF INVENTION

Technical Problem

Even the methods described in Japanese Patent Laid-Open No. 2011-233542, Japanese Patent No. 4822567, and Japanese Patent Laid-Open No. 2011-74119, however, fail to improve the productivity of continuous processing and resistance to end breakage during the production of microporous membranes, fibers, etc. as well as the dimensional stability and acid resistance of products.

The present invention has been made in light of these problems, and an object of the present invention is to provide a polyethylene powder which can offer a fiber excellent in resistance to end breakage, dimensional stability, and acid resistance and/or a microporous membrane excellent in dimensional stability and acid resistance, and a microporous membrane and a fiber which are obtained by forming the polyethylene powder.

Solution to Problem

The present inventors have conducted diligent studies to attain the object. As a result, the present inventors have completed the present invention by finding that the object can be attained by a polyethylene powder containing a specific amount of aluminum hydroxide having a specific particle size and a specific amount of magnesium, wherein the polyethylene has a specific molecular weight.

Specifically, the present invention is as follows:
[1]
A polyethylene powder comprising:
0.5 ppm or higher and 3,000 ppm or lower of an aluminum hydroxide having an average particle size smaller than 50 μm; and
0.5 ppm or higher and 12 ppm or lower of a magnesium element, wherein a viscosity-average molecular weight of the polyethylene powder is 100,000 or larger.
[2]
The polyethylene powder according to [1], wherein a content of the aluminum hydroxide having a minor axis of 50 μm or larger is 10 particles or less in 500 g of the polyethylene powder.
[3]
A microporous membrane which is obtained by forming the polyethylene powder according to [1] or [2].
[4]
A fiber which is obtained by forming the polyethylene powder according to [1] or [2].
[5]
A method for producing a polyethylene powder according to [1], comprising the steps of:
polymerizing ethylene in the presence of a catalyst for olefin polymerization to obtain a polyethylene powder;
deactivating the catalyst for olefin polymerization; and
drying the polyethylene powder, wherein the step of deactivating the catalyst for olefin polymerization comprises spraying a catalyst deactivator onto the polyethylene powder.

[6]

The method for producing the polyethylene powder according to [5], wherein the catalyst deactivator is water, wherein the water is sprayed in a form of steam.

[7]

The method for producing the polyethylene powder according to [5] or [6], wherein the catalyst deactivator is water, wherein the water is sprayed in a form of steam as a mixed gas with an inert gas.

Advantageous Effects of Invention

The present invention can provide a polyethylene powder which can offer a fiber excellent in resistance to end breakage, dimensional stability, and acid resistance and/or a microporous membrane excellent in dimensional stability and acid resistance, and a microporous membrane and a fiber which are obtained by forming the polyethylene powder.

DESCRIPTION OF EMBODIMENT

Hereinafter, a mode for carrying out the present invention (hereinafter, simply referred to as the "present embodiment") will be described in detail. The present embodiment mentioned below will be given merely for illustrative purposes in order to explain the present invention and is not intended to limit the present invention to the contents described herein. Various changes or modifications can be made in the present invention without departing from the spirit thereof.

[Polyethylene Powder]

The polyethylene powder of the present embodiment comprises: 0.5 ppm or higher and 3,000 ppm or lower of an aluminum hydroxide having an average particle size smaller than 50 μm; and 0.5 ppm or higher and 12 ppm or lower of a magnesium element, wherein a viscosity-average molecular weight of the polyethylene powder is 100,000 or larger.

The polyethylene powder thus configured can offer a fiber excellent in resistance to end breakage, dimensional stability, and acid resistance and/or a microporous membrane excellent in dimensional stability and acid resistance. According to a preferred aspects, the present invention can provide a polyethylene powder excellent in the productivity of continuous processing of a fiber and/or a microporous membrane.

[Aluminum Hydroxide]

The polyethylene powder of the present embodiment comprises 0.5 ppm or higher and 3,000 ppm or lower of aluminum hydroxide having an average particle size smaller than 50 μm. Such aluminum hydroxide contained therein further improves the dimensional stability of a product. Although it is not certain why the dimensional stability of a product is improved, this is probably because the aluminum hydroxide during forming lowers the temperature in a forming machine through its thermal dehydration reaction to uniformize the temperature and viscosity of the polyethylene in the forming machine. Particularly, the effects of the aluminum hydroxide become more prominent as the forming rate is accelerated.

The content of the aluminum hydroxide having an average particle size smaller than 50 μm is 0.5 ppm or higher, preferably 2 ppm or higher, more preferably 10 ppm or higher, further preferably 100 ppm or higher, particularly preferably 300 ppm or higher, from the viewpoint of resistance to end breakage, dimensional stability of a product, and acid resistance. The content thereof is 3,000 ppm or lower, preferably 2,000 ppm or lower, more preferably 1,000 ppm or lower, from the viewpoint of dimensional stability and resistance to end breakage.

The content of the aluminum hydroxide can be adjusted by a production method mentioned later and can be measured by a method described later in Examples.

The average particle size of the aluminum hydroxide is smaller than 50 μm, preferably 30 μm or smaller, more preferably 20 μm or smaller, further preferably 10 μm or smaller. The aluminum hydroxide having an average particle size smaller than 50 μm improves the productivity of continuous processing in forming and further improves the resistance of a fiber to end breakage.

There is no particular lower limit on the average particle size of the aluminum hydroxide. The average particle size of the aluminum hydroxide is preferably 0.02 μm or larger, more preferably 0.1 μm or larger, further preferably 0.5 μm or larger. The aluminum hydroxide having an average particle size of 0.02 μm or larger tends to further uniformize the temperature of the polyethylene powder in a forming apparatus such as an extruder and to further improve the dimensional stability of a product.

In this context, the "average particle size" refers to D50 obtained from SEM images and can be measured by a method described later in Examples.

Amorphous aluminum hydroxide or crystalline aluminum hydroxide (which has a pseudo-boehmite or bayerite crystal form) can be used as the aluminum hydroxide having an average particle size smaller than 50 μm. Specific examples thereof include APYRAL® (Nabaltec AG) and HIGILITE® (Showa Denko K.K.).

Such aluminum hydroxide can be mixed with polyethylene particles obtained by polymerization or can be added in the course of the polymerization step for the polyethylene to obtain the polyethylene powder of the present embodiment. Specifically, the aluminum hydroxide according to the present embodiment may be present in the inside of polyethylene particles or may be present as a mixture of polyethylene particles and the aluminum hydroxide. In the case of the mixture of polyethylene particles and the aluminum hydroxide, the aluminum hydroxide may reside on the surface of the polyethylene particles or may exist independently of the polyethylene particles. Alternatively, the aluminum hydroxide may be residues of a component used as a polymerization catalyst or promoter for the polyethylene mentioned later.

[Magnesium Element]

The polyethylene powder of the present embodiment comprises 0.5 ppm or higher and 12 ppm or lower of a magnesium element. The content of the magnesium element is 0.5 ppm or higher, preferably 1 ppm or higher, further preferably 3 ppm or higher, particularly preferably 5 ppm or higher, from the viewpoint of resistance to end breakage. The content thereof is 12 ppm or lower, preferably 8 ppm or lower, further preferably 7 ppm or lower, particularly preferably 6 ppm or lower, from the viewpoint of acid resistance and resistance to end breakage. The magnesium element may be residues of a component used as a polymerization catalyst or promoter for the polyethylene mentioned later.

The content of the magnesium element can be controlled by the type and amount of a polymerization catalyst or promoter or by the adjustment of polymerization conditions. A production method and a polymerization catalyst preferred for the polyethylene will be mentioned later. The content of the magnesium element can be measured by a method described later in Examples.

[Polyethylene]

Specific examples of the polyethylene include ethylene homopolymers and copolymers of ethylene and at least one olefin selected from the group consisting of α-olefins having 3 to 20 carbon atoms, cyclic olefins having 3 to 20 carbon atoms, compounds represented by the formula $CH_2=CHR^1$ (wherein $R^1$ is an aryl group having 6 to 20 carbon atoms), and linear, branched, or cyclic dienes having 4 to 20 carbon atoms. The olefin to be copolymerized is preferably propylene or 1-butene from the viewpoint of heat resistance and mechanical strength of a formed article. The molar ratio of the ethylene to the polyethylene is preferably 50% or more and 100% or less, more preferably 80% or more and 100% or less, further preferably 90% or more and 100% or less.

The viscosity-average molecular weight (Mv) of the polyethylene is 100,000 or larger. The viscosity-average molecular weight (Mv) of the polyethylene can be measured by a method described later in Examples.

For lithium ion secondary battery separators, the viscosity-average molecular weight is preferably 100,000 or larger and 2,000,000 or smaller, more preferably 150,000 or larger and 1,500,000 or smaller, further preferably 200,000 or larger and 1,200,000 or smaller, from the viewpoint of productivity of continuous processing, drawing workability, and mechanical strength of a membrane.

For lead storage battery separators, the viscosity-average molecular weight is preferably 4,000,000 or larger, more preferably 5,000,000 or larger, further preferably 6,000,000 or larger, from the viewpoint of acid resistance. For this purpose, the viscosity-average molecular weight is preferably 10,000,000 or smaller, more preferably 8,000,000 or smaller, from the viewpoint of productivity of continuous processing.

For fibers, the viscosity-average molecular weight is preferably 1,500,000 or larger, more preferably 2,000,000 or larger, further preferably 3,000,000 or larger, still further preferably 4,000,000 or larger, from the viewpoint of drawing workability and stability of physical properties of a fiber. For this purpose, the viscosity-average molecular weight is preferably 10,000,000 or smaller, more preferably 8,000,000 or smaller, from the viewpoint of productivity of continuous processing.

[Aluminum Hydroxide Having Minor Axis of 50 μm or Larger]

The polyethylene powder of the present embodiment may comprise aluminum hydroxide having a minor axis of 50 μm or larger from the viewpoint of productivity of continuous processing and dimensional stability of a product. The number of particles of the aluminum hydroxide having a minor axis of 50 μm or larger is preferably 10 particles or less, more preferably 8 particles or less, further preferably 4 particles or less, still further preferably 3 particles or less, still further preferably 2 particles or less, particularly preferably 1 particle or less, in 500 g of the polyethylene powder.

The identification of the aluminum hydroxide and the calculation of its particle size and the number of particles can be carried out by methods described later in Examples.

The aluminum hydroxide having a minor axis of 50 μm or larger according to the present embodiment is composed mainly of, but not limited to, aluminum hydroxide and may comprise an additional inorganic or organic compound. For example, aluminum hydroxide with a slight amount of polyethylene attached to its surface may be used. Such aluminum hydroxide can be separated from the polyethylene powder by the separation method mentioned below.

The particle size of the aluminum hydroxide and the number of particles of the aluminum hydroxide having a minor axis of 50 μm or larger can be controlled, as mentioned later, by the amount of a catalyst or a promoter added or by the adjustment of polymerization conditions or polymerization posttreatment conditions.

Here, the "productivity of continuous processing" and the "dimensional stability of a product" will be described.

For example, for processing into a microporous membrane typified by a secondary battery separator, the polyethylene powder is dissolved in a solvent and prepared into the membrane by a forming process using an extruder or the like. In this operation, a filter or the like is disposed upstream of a die for the purpose of removing insoluble matter, etc. If any material is accumulated on this filter, the pressure proximal to the filter is gradually elevated to reach the torque limit of the extruder or causes a nonuniform film thickness of the resulting membrane. This requires the replacement of the filter and thus requires the shutdown of the extruder or the replacement of the filter using a screen changer or the like so that continuous production in the processing of products is hindered, resulting in reduced product yields.

For processing by spinning into a thread typified by a high-strength fiber, the polyethylene powder is dissolved in a solvent and prepared into the thread by a forming process using an extruder or the like. In this operation, a filter or the like is disposed upstream of a die for the purpose of removing insoluble matter, etc. If any material is accumulated on this filter, the pressure proximal to the filter is gradually elevated to reach the torque limit of the extruder or causes a nonuniform thread diameter or end breakage of the resulting thread. This requires the replacement of the filter and thus requires the shutdown of the extruder or the replacement of the filter using a screen changer or the like so that continuous production in the processing of products is hindered, resulting in reduced product yields.

In the present invention, the "productivity of continuous processing" is indicated by the elevation of the pressure proximal to the filter, for example, during processing into a microporous membrane or a high-strength fiber. The phrase "excellent in productivity of continuous processing" means that the pressure proximal to the filter is slowly elevated or rarely elevated. The "dimensional stability of a product" is indicated by the stability of the film thickness of a microporous membrane or the thread diameter of a high-strength fiber. The phrase "excellent in dimensional stability of a product" means that the film thickness or the thread diameter is less uneven.

The productivity of continuous processing is largely influenced by 10 particles or less of the aluminum hydroxide having a minor axis of 50 μm or larger in 500 g of the polyethylene powder. Specifically, use of the polyethylene powder of the present embodiment as a raw material eliminates the need of filter replacement of the extruder (or reduces the frequency of this replacement) and exceedingly stabilizes the film thickness of the resulting microporous membrane or exceedingly stabilizes the thread diameter of the resulting fiber.

On the other hand, the polyethylene powder may contain, for example, an aliphatic carboxylic acid metal salt typified by calcium stearate or zinc stearate. Surprisingly, these effects can be exerted by merely setting the content of the aluminum hydroxide having a minor axis of 50 μm or larger to 10 particles or less in the polyethylene powder.

[Polymerization Method for Polyethylene]

The polyethylene according to the present embodiment is obtained by the homopolymerization of ethylene or by the polymerization of ethylene with an olefin other than ethylene in the presence of a catalyst for olefin polymerization. The catalytic component for use in the production of the polyethylene according to the present embodiment is not particularly limited, and the polyethylene according to the present embodiment can be produced using a general Ziegler-Natta catalyst or metallocene catalyst.

(Ziegler-Natta catalyst)

The Ziegler-Natta catalyst is preferably a catalyst for olefin polymerization comprising a solid catalytic component [A] and an organic metal compound component [B], wherein the solid catalytic component [A] is produced by reacting an organic magnesium compound (A-1) represented by the formula 1 which is soluble in an inert hydrocarbon solvent with a titanium compound (A-2) represented by the formula 2:

(A-1):$(M^1)_\alpha(Mg)_\beta(R^2)_a(R^3)_b Y^1_c$       Formula 1 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N=C—$R^4$, $R^5$, —$SR^6$ (wherein $R^4$, $R^5$, and $R^6$ each represent a hydrocarbon group having 1 or more and 20 or less carbon atoms, and when c is 2, $Y^1$ moieties may be different from each other), and a α-keto acid residue; and α, β, a, b, and c each represent a real number that satisfies the following relationships: $0 \leq \alpha$, $0 < \beta$, $0 \leq a$, $0 \leq b$, $0 \leq c$, $0 < a+b$, $0 \leq c/(\alpha+\beta) \leq 2$, and $n\alpha + 2\beta = a+b+c$ (wherein n represents the valence of $M^1$); and

(A-2):$Ti(OR^7)_d X^1_{(4-d)}$       Formula 2 wherein d represents a real number of 0 or larger and 4 or smaller; $R^7$ represents a hydrocarbon group having 1 or more and 20 or less carbon atoms; and $X^1$ represents a halogen atom.

Specific examples of the inert hydrocarbon solvent for use in the reaction between the compounds (A-1) and (A-2) include, but are not particularly limited to: aliphatic hydrocarbons such as pentane, hexane, and heptane; aromatic hydrocarbons such as benzene and toluene; and alicyclic hydrocarbons such as cyclohexane and methylcyclohexane.

First, the compound (A-1) will be described. The compound (A-1) is represented in the form of an organic magnesium complex compound soluble in an inert hydrocarbon solvent, but encompasses all of dihydrocarbyl magnesium compounds and their complexes with other metal compounds. The relational expression $n\alpha + 2\beta = a+b+c$ of the symbols α, β, a, b, and c represents the stoichiometry of metal atom valence and substituents.

In the formula 1, specific examples of the hydrocarbon group having 2 or more and 20 or less carbon atoms, represented by $R^2$ or $R^3$ include, but are not particularly limited to, alkyl groups, cycloalkyl groups, and aryl groups, for example, ethyl, propyl, butyl, pentyl, hexyl, octyl, decyl, cyclohexyl, and phenyl groups. Among them, alkyl groups are preferred. When α>0, a metal atom selected from the group consisting of groups 12, 13, and 14 of the periodic system can be used as the metal atom $M^1$. Examples thereof include zinc, boron, and aluminum. Among them, aluminum and zinc are preferred.

The ratio β/α of magnesium to the metal atom $M^1$ is not particularly limited and is preferably 0.1 or more and 30 or less, more preferably 0.5 or more and 10 or less. In the case of using a predetermined organic magnesium compound wherein α=0, for example, a compound wherein $R^2$ is 1-methylpropyl is soluble in an inert hydrocarbon solvent. Such a compound also brings about a preferred consequence to the present embodiment. In the formula 1 wherein α=0, $R^2$ and $R^3$ preferably satisfy any one of the following three groups (1), (2), and (3):

Group (1): preferably, at least one of $R^2$ and $R^3$ is a secondary or tertiary alkyl group having 4 or more and 6 or less carbon atoms, more preferably, both of $R^2$ and $R^3$ are alkyl groups having 4 or more and 6 or less carbon atoms and at least one of the groups is a secondary or tertiary alkyl group;

Group (2): preferably, $R^2$ and $R^3$ are alkyl groups differing in the number of carbon atoms, more preferably, $R^2$ is an alkyl group having 2 or 3 carbon atoms and $R^3$ is an alkyl group having 4 or more carbon atoms; and Group (3): preferably, at least one of $R^2$ and $R^3$ is a hydrocarbon group having 6 or more carbon atoms, more preferably, an alkyl group wherein the total number of carbon atoms contained in $R^2$ and $R^3$ is 12 or more.

Hereinafter, these groups will be shown specifically. In Group (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Group (2), specific examples of the alkyl group having 2 or 3 carbon atoms include ethyl, 1-methylethyl, and propyl groups. Among them, an ethyl group is particularly preferred. Specific examples of the alkyl group having 4 or more carbon atoms include, but are not particularly limited to, butyl, pentyl, hexyl, heptyl, and octyl groups. Among them, butyl and hexyl groups are particularly preferred.

In Group (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. An alkyl group having a moderate chain length is therefore preferably used in terms of handling. The organic magnesium compound can be diluted, for use, with an inert hydrocarbon solvent. This solution can be used without any problem even if trace amounts of Lewis basic compounds such as ethers, esters, and amines are contained or remain therein.

Next, $Y^1$ will be described. In the formula 1, $Y^1$ is any of alkoxy, siloxy, allyloxy, amino, amide, —N=C—$R^4$, $R^5$, —$SR^6$ (wherein $R^4$, $R^5$, and $R^6$ each independently represent a hydrocarbon group having 2 or more and 20 or less carbon atoms), and a β-keto acid residue.

In the formula 1, the hydrocarbon group represented by $R^4$, $R^5$, or $R^6$ is preferably an alkyl or aryl group having 1 or more and 12 or less carbon atoms, particularly preferably an alkyl or aryl group having 3 or more and 10 or less carbon atoms. Specific examples of such an alkyl or aryl group include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

In the formula 1, $Y^1$ is preferably an alkoxy group or a siloxy group. Specific examples of the alkoxy group preferably include, but are not particularly limited to, methoxy, ethoxy, propoxy, 1-methylethoxy, butoxy, 1-methylpropoxy, 1,1-dimethylethoxy, pentoxy, hexoxy, 2-methylpentoxy, 2-ethylbutoxy, 2-ethylpentoxy, 2-ethylhexoxy, 2-ethyl-4-methylpentoxy, 2-propylheptoxy, 2-ethyl-5-methyloctoxy, octoxy, phenoxy, and naphthoxy groups. Among them, butoxy, 1-methylpropoxy, 2-methylpentoxy, and 2-ethylhexoxy groups are more preferred.

Specific examples of the siloxy group preferably include, but are not particularly limited to, hydrodimethylsiloxy, ethylhydromethylsiloxy, diethylhydrosiloxy, trimethylsiloxy, ethyldimethylsiloxy, diethylmethylsiloxy, and triethylsiloxy groups. Among them, hydrodimethylsiloxy, ethylhydromethylsiloxy, diethylhydrosiloxy, and trimethylsiloxy groups are more preferred.

The compound (A-1) can be synthesized by any method without particular limitations and may be synthesized by reacting an organic magnesium compound selected from the group consisting of the formulas $R^2MgX^1$ and $R^2{}_2Mg$ (wherein $R^2$ is as defined above, and $X^1$ represents halogen) with an organic metal compound selected from the group consisting of the formulas $M^1R^3{}_n$ and $M^1R^3{}_{(n-1)}H$ (wherein $M^1$ and $R^3$ are as defined above, and n represents the valence of $M^1$) at 25° C. or higher and 150° C. or lower in an inert hydrocarbon solvent and, if necessary, subsequently with a compound represented by the formula $Y^1$—H (wherein $Y^1$ is as defined above) or with an organic magnesium compound and/or an organic aluminum compound having a functional group represented by $Y^1$. In the approach of reacting the organic magnesium compound soluble in an inert hydrocarbon solvent with a compound represented by the formula $Y^1$—H, the order in which the compounds are added to the reaction system is not particularly limited. Any of the following methods can be used: the compound represented by the formula $Y^1$—H is added into the organic magnesium compound; the organic magnesium compound is added into the compound represented by the formula $Y^1$—H; and both of the compounds are added at the same time.

The molar composition ratio $c/(\alpha+\beta)$ of $Y^1$ to all metal atoms in the compound (A-1) is $0 \le c/(\alpha+\beta) \le 2$, preferably $0 \le c/(\alpha+\beta) < 1$. The compound (A-1) wherein the molar composition ratio of $Y^1$ to all metal atoms is 2 or less tends to have better reactivity with the compound (A-2).

Next, the compound (A-2) will be described. The compound (A-2) is a titanium compound represented by the formula 2:

(A-2):Ti(OR$^7$)$_d$X$^1{}_{(4-d)}$  Formula 2 wherein d represents a real number of 0 or larger and 4 or smaller; $R^7$ represents a hydrocarbon group having 1 or more and 20 or less carbon atoms; and $X^1$ represents a halogen atom.

In the formula 2, d is preferably 0 or larger and 1 or smaller, more preferably 0. In the formula 2, specific examples of the hydrocarbon group represented by $R^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Examples of the halogen represented by $X^1$ include chlorine, bromine, and iodine. Among them, chlorine is preferred. In the present embodiment, the compound (A-2) is most preferably titanium tetrachloride. In the present embodiment, two or more compounds selected from these compounds may be used as a mixture.

Next, the reaction between the compounds (A-1) and (A-2) will be described. This reaction is preferably carried out in an inert hydrocarbon solvent and more preferably carried out in an aliphatic hydrocarbon solvent such as hexane or heptane.

In this reaction, the molar ratio between (A-1) and (A-2) is not particularly limited, and the molar ratio (Ti/Mg) of Ti atom contained in the compound (A-2) to Mg atom contained in the compound (A-1) is preferably 0.1 or more and 10 or less, more preferably 0.3 or more and 3 or less. The reaction temperature is not particularly limited and is −80° C. or higher and 150° C. or lower, more preferably −40° C. to 100° C. The order in which the compounds (A-1) and (A-2) are added to the reaction system is not particularly limited. Any of the following methods can be used: the compound (A-2) is added subsequently to the compound (A-1); the compound (A-1) is added subsequently to the compound (A-2); and the compounds (A-1) and (A-2) are added at the same time. The method of adding the compounds (A-1) and (A-2) at the same time is preferred. In the present embodiment, the solid catalytic component [A] obtained by the reaction is used as a slurry solution with an inert hydrocarbon solvent.

As another example, the Ziegler-Natta catalytic component is preferably a catalyst for olefin polymerization comprising a solid catalytic component [C] and an organic metal compound component [B], wherein the solid catalytic component [C] is produced by reacting an organic magnesium compound (C-1) represented by the formula 3 which is soluble in an inert hydrocarbon solvent with a chlorinating agent (C-2) represented by the formula 4, and allowing an organic magnesium compound (C-4) represented by the formula 5 which is soluble in an inert hydrocarbon solvent and a titanium compound (C-5) represented by the formula 6 to be supported by a carrier (C-3) thus prepared:

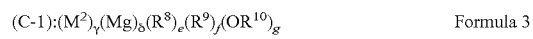
(C-1):(M$^2$)$_\gamma$(Mg)$_\delta$(R$^8$)$_e$(R$^9$)$_f$(OR$^{10}$)$_g$  Formula 3 wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \le \gamma$, $0 < \delta$, $0 \le e$, $0 \le f$, $0 \le g$, $0 < e+f$, $0 \le g/(\gamma+\delta) \le 2$, and $k\gamma+2\delta=e+f+g$ (wherein k represents the valence of $M^2$);

(C-2):H$_h$SiCl$_i$R$^{11}{}_{(4-(h+i))}$  Formula 4 wherein $R^{11}$ represents a hydrocarbon group having 1 or more and 12 or less carbon atoms; and h and i each represent a real number that satisfies the following relationships: $0 < h$, $0 < i$, and $0 < h+i \le 4$;

(C-4):(M$^1$)$_\alpha$(Mg)$_\beta$(R$^2$)$_a$(R$^3$)$_b$Y$^1{}_c$  Formula 5 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, —N═C—R$^4$, R$^5$, —SR$^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \le \alpha$, $0 < \beta$, $0 \le a$, $0 \le b$, $0 \le c$, $0 < a+b$, $0 \le c/(\alpha+\beta) \ge 2$, and $n\alpha+2\beta=a+b+c$ (wherein n represents the valence of $M^1$); and

(C-5):Ti(OR$^7$)$_d$X$^1{}_{(4-d)}$  Formula 6 wherein d represents a real number of 0 or larger and 4 or smaller; $R^7$ represents a hydrocarbon group having 1 or more and 20 or less carbon atoms; and $X^1$ represents a halogen atom.

First, the compound (C-1) will be described. The compound (C-1) is represented in the form of an organic magnesium complex compound soluble in an inert hydrocarbon solvent, but encompasses all of dihydrocarbyl magnesium compounds and their complexes with other metal compounds. In the formula 3, the relational expression $k\gamma+2\delta=e+f+g$ of the symbols $\gamma$, $\delta$, e, f, and g represents the stoichiometry of metal atom valence and substituents.

In the formula, specific examples of the hydrocarbon group represented by $R^8$ or $R^9$ include, but are not particularly limited to, alkyl groups, cycloalkyl groups, and aryl groups, for example, methyl, ethyl, propyl, butyl, pentyl, hexyl, octyl, decyl, cyclohexyl, and phenyl groups. Among them, alkyl groups are preferred for each of $R^8$ and $R^9$. When $\alpha>0$, a metal atom selected from the group consisting of groups 12, 13, and 14 of the periodic system can be used as the metal atom $M^2$. Examples thereof include zinc, boron, and aluminum. Among them, aluminum and zinc are particularly preferred.

The ratio $\delta/\gamma$ of magnesium to the metal atom $M^2$ is not particularly limited and is preferably 0.1 or more and 30 or less, more preferably 0.5 or more and 10 or less. In the case of using a predetermined organic magnesium compound wherein $\gamma=0$, for example, a compound wherein $R^8$ is 1-methylpropyl is soluble in an inert hydrocarbon solvent. Such a compound also brings about a preferred consequence to the present embodiment. In the formula 3 wherein $\gamma=0$, $R^8$ and $R^9$ preferably satisfy any one of the following three groups (1), (2), and (3):

Group (1): preferably, at least one of $R^8$ and $R^9$ is a secondary or tertiary alkyl group having 4 or more and 6 or less carbon atoms, more preferably, both of $R^8$ and $R^9$ are alkyl groups having 4 or more and 6 or less carbon atoms and at least one of the groups is a secondary or tertiary alkyl group;

Group (2): preferably, $R^8$ and $R^9$ are alkyl groups differing in the number of carbon atoms, more preferably, $R^8$ is an alkyl group having 2 or 3 carbon atoms and $R^9$ is an alkyl group having 4 or more carbon atoms; and Group (3): preferably, at least one of $R^8$ and $R^9$ is a hydrocarbon group having 6 or more carbon atoms, more preferably, an alkyl group wherein the total number of carbon atoms contained in $R^8$ and $R^9$ is 12 or more.

Hereinafter, these groups will be shown specifically. In Group (1), specific examples of the secondary or tertiary alkyl group having 4 or more and 6 or less carbon atoms include 1-methylpropyl, 2-methylpropyl, 1,1-dimethylethyl, 2-methylbutyl, 2-ethylpropyl, 2,2-dimethylpropyl, 2-methylpentyl, 2-ethylbutyl, 2,2-dimethylbutyl, and 2-methyl-2-ethylpropyl groups. Among them, a 1-methylpropyl group is particularly preferred.

In Group (2), examples of the alkyl group having 2 or 3 carbon atoms include ethyl, 1-methylethyl, and propyl groups. Among them, an ethyl group is particularly preferred. Specific examples of the alkyl group having 4 or more carbon atoms, but are not particularly limited to, butyl, pentyl, hexyl, heptyl, and octyl groups. Among them, butyl and hexyl groups are particularly preferred.

In Group (3), specific examples of the hydrocarbon group having 6 or more carbon atoms include, but are not particularly limited to, hexyl, heptyl, octyl, nonyl, decyl, phenyl, and 2-naphthyl groups. Among these hydrocarbon groups, alkyl groups are preferred. Among the alkyl groups, hexyl and octyl groups are particularly preferred.

According to general tendencies, an alkyl group containing a larger number of carbon atoms is more soluble in an inert hydrocarbon solvent and forms a solution having a higher viscosity. A moderately long-chain alkyl group is therefore preferably used in terms of handling. The organic magnesium compound is used as an inert hydrocarbon solution. This solution can be used without any problem even if trace amounts of Lewis basic compounds such as ethers, esters, and amines are contained or remain therein.

Next, the alkoxy group ($OR^{10}$) will be described. The hydrocarbon group represented by $R^{10}$ is preferably an alkyl or aryl group having 1 or more and 12 or less carbon atoms, particularly preferably an alkyl or aryl group having 3 or more and 10 or less carbon atoms. Specific examples of $R^{10}$ include, but are not particularly limited to, methyl, ethyl, propyl, 1-methylethyl, butyl, 1-methylpropyl, 1,1-dimethylethyl, pentyl, hexyl, 2-methylpentyl, 2-ethylbutyl, 2-ethylpentyl, 2-ethylhexyl, 2-ethyl-4-methylpentyl, 2-propylheptyl, 2-ethyl-5-methyloctyl, octyl, nonyl, decyl, phenyl, and naphthyl groups. Among them, butyl, 1-methylpropyl, 2-methylpentyl, and 2-ethylhexyl groups are particularly preferred.

The compound (C-1) can be synthesized by any method without particular limitations and is preferably synthesized by a method of reacting an organic magnesium compound selected from the group consisting of the formulas $R^8MgX^1$ and $R^8_2Mg$ (wherein $R^8$ is as defined above, and $X^1$ represents a halogen atom) with an organic metal compound selected from the group consisting of the formulas $M^2R^9_k$ and $M^2R^9_{(k-1)}H$ (wherein $M^2$, $R^9$, and k are as defined above) at a temperature of 25° C. or higher and 150° C. or lower in an inert hydrocarbon solvent and, if necessary, subsequently with an alcohol having a hydrocarbon group represented by $R^9$ (wherein $R^9$ is as defined above) or an alkoxy magnesium compound and/or an alkoxy aluminum compound having a hydrocarbon group represented by $R^9$ which is soluble in an inert hydrocarbon solvent.

In the approach of reacting the organic magnesium compound soluble in an inert hydrocarbon solvent with an alcohol, the order in which the compounds are added to the reaction system is not particularly limited. Any of the following methods can be used: the alcohol is added into the organic magnesium compound; the organic magnesium compound is added into the alcohol; and both of the compounds are added at the same time. In the present embodiment, the ratio between the organic magnesium compound soluble in an inert hydrocarbon solvent and the alcohol in the reaction is not particularly limited, and the molar composition ratio $g/(\gamma+\delta)$ of the alkoxy group to all metal atoms in the resulting alkoxy group-containing organic magnesium compound is $0 \le g/(\gamma+\delta) \le 2$, preferably $0 \le g/(\gamma+\delta) < 1$.

Next, the compound (C-2) will be described. The compound (C-2) is a silicon chloride compound having at least one Si—H bond, represented by the formula 4:

$$(C\text{-}2){:}H_hSiCl_iR^{11}{}_{(4-(h+i))} \quad \text{Formula 4}$$

wherein $R^{11}$ represents s hydrocarbon group having 1 or more and 12 or less carbon atoms; and h and i each represent a real number that satisfies the following relationships: $0<h$, $0<i$, and $0<h+i \le 4$.

In the formula 4, specific examples of the hydrocarbon group represented by $R^{11}$ include, but are not particularly limited to, aliphatic hydrocarbon groups, alicyclic hydrocarbon groups, and aromatic hydrocarbon groups, for example, methyl, ethyl, propyl, 1-methylethyl, butyl, pentyl, hexyl, octyl, decyl, cyclohexyl, and phenyl groups. Among them, alkyl groups having 1 or more and 10 or less carbon atoms are preferred, and alkyl groups having 1 to 3 carbon atoms, such as methyl, ethyl, propyl, and 1-methylethyl group are more preferred. Each of h and i is a number larger than 0 that satisfies the relationship $h+i \le 4$. Preferably, i is 2 or larger and 3 or smaller.

Specific examples of such a compound include, but are not particularly limited to, $HSiCl_3$, $HSiCl_2CH_3$, $HSiCl_2C_2H_5$, HSiCl$_2$(C$_3$H$_7$), HSiCl$_2$(2-C$_3$H$_7$), HSiCl$_2$(C$_4$H$_9$), HSiCl$_2$(C$_6$H$_5$), HSiCl$_2$(4-Cl—C$_6$—CH$_4$), HSiCl$_2$(CH=CH$_2$), HSiCl$_2$(CH$_2$C$_6$H$_5$), HSiCl$_2$(1-C$_{10}$H$_7$), HSiCl$_2$(CH$_2$CH=CH$_2$), H$_2$SiCl(CH$_3$), H$_2$SiCl(C$_2$H$_5$), HSiCl(CH$_3$)$_2$, HSiCl(C$_2$H$_5$)$_2$, HSiCl(CH$_3$)(2-C$_3$H$_7$), HSiCl(CH$_3$)(C$_6$H$_5$), and HSiCl(C$_6$H$_5$)$_2$. These silicon chloride compounds are used each alone or as a mixture of two or more types selected from these compounds. Among them, HSiCl$_3$, HSiCl$_2$CH$_3$, HSiCl(CH$_3$)$_2$, and HSiCl$_2$(C$_3$H$_7$) are preferred, and HSiCl$_3$ and HSiCl$_2$CH$_3$ are more preferred.

Next, the reaction between the compounds (C-1) and (C-2) will be described. For the reaction, the compound (C-2) is preferably used after being diluted in advance with an inert hydrocarbon solvent, a chlorinated hydrocarbon (e.g., 1,2-dichloroethane, o-dichlorobenzene, or dichloromethane), an ether vehicle (e.g., diethyl ether or tetrahydrofuran), or a mixed vehicle thereof. Among them, an inert hydrocarbon solvent is more preferred in terms of the performance of the catalyst. The ratio between (C-1) and (C-2) in the reaction is not particularly limited and is preferably 0.01 mol or higher and 100 mol or lower, more preferably 0.1 mol or higher and 10 mol or lower, of silicon atom contained in the compound (C-2) with respect to 1 mol of magnesium atom contained in the compound (C-1).

The method for reacting the compounds (C-1) and (C-2) is not particularly limited. Any of the following methods can be used: the compounds (C-1) and (C-2) are reacted while introduced at the same time to a reactor (simultaneous addition method); a reactor is charged with the compound (C-2) in advance, and then, the compound (C-1) is introduced to the reactor; and a reactor is charged with the compound (C-1) in advance, and then, the compound (C-2) is introduced to the reactor. Among them, the method of charging a reactor with the compound (C-2) in advance and then introducing the compound (C-1) to the reactor is preferred. The carrier (C-3) obtained by the reaction is preferably separated by filtration or decantation and then thoroughly washed with an inert hydrocarbon solvent to remove unreacted materials or by-products, etc.

The temperature of the reaction between the compounds (C-1) and (C-2) is not particularly limited and is preferably 25° C. or higher and 150° C. or lower, more preferably 30° C. or higher and 120° C. or lower, further preferably 40° C. or higher and 100° C. or lower. In the simultaneous addition method in which the compounds (C-1) and (C-2) are reacted while introduced at the same time to a reactor, the reaction temperature is preferably adjusted to a predetermined temperature by preliminarily setting the temperature of the reactor to a predetermined temperature and adjusting the temperature in the reactor to a predetermined temperature while performing the simultaneous addition. In the method of charging a reactor with the compound (C-2) in advance and then introducing the compound (C-1) to the reactor, the reaction temperature is preferably adjusted to a predetermined temperature by adjusting the temperature of the reactor charged with the silicon chloride compound to a predetermined temperature and adjusting the temperature in the reactor to a predetermined temperature while introducing the organic magnesium compound to the reactor. In the method of charging a reactor with the compound (C-1) in advance and then introducing the compound (C-2) to the reactor, the reaction temperature is adjusted to a predetermined temperature by adjusting the temperature of the reactor charged with the compound (C-1) to a predetermined temperature and adjusting the temperature in the reactor to a predetermined temperature while introducing the compound (C-2) to the reactor.

Next, the organic magnesium compound (C-4) will be described. The compound (C-4) is preferably represented by the formula 5:

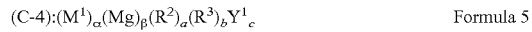

(C-4):(M$^1$)$_\alpha$(Mg)$_\beta$(R$^2$)$_a$(R$^3$)$_b$Y$^1_c$      Formula 5 wherein M$^1$ represents a metal atom selected from the group consisting of groups 12, 13, and 14 of the periodic system; R$^2$ and R$^3$ each represent a hydrocarbon group having 2 or more and 20 or less carbon atoms; Y$^1$ represents any of alkoxy, siloxy, allyloxy, amino, amide, —N=C—R$^4$, R$^5$, —SR$^6$ (wherein R$^4$, R$^5$, and R$^6$ each represent a hydrocarbon group having 1 or more and 20 or less carbon atoms, and when c is 2, Y$^1$ moieties may be different from each other), and a β-keto acid residue; and α, β, a, b, and c each represent a real number that satisfies the following relationships: 0≤α, 0<β, 0≤a, 0≤b, 0≤c, 0<a+b, 0≤c/(α+β)≤2, and nα+2β=a+b+c (wherein n represents the valence of M$^1$).

The amount of the compound (C-4) used is preferably 0.1 or more and 10 or less, more preferably 0.5 or more and 5 or less, in terms of the molar ratio of magnesium atom contained in the compound (C-4) to titanium atom contained in the compound (C-5).

The temperature of the reaction between the compounds (C-4) and (C-5) is not particularly limited and is preferably −80° C. or higher and 150° C. or lower, more preferably −40° C. or higher and 100° C. or lower.

The concentration of the compound (C-4) in use is not particularly limited and is preferably 0.1 mol/L or higher and 2 mol/L or lower, more preferably 0.5 mol/L or higher and 1.5 mol/L or lower, on the basis of titanium atom contained in the compound (C-4). An inert hydrocarbon solvent is preferably used for diluting the compound (C-4).

The order in which the compounds (C-4) and (C-5) are added to the carrier (C-3) is not particularly limited. Any of the following methods can be used: the compound (C-5) is added subsequently to the compound (C-4); the compound (C-4) is added subsequently to the compound (C-5); and the compounds (C-4) and (C-5) are added at the same time. Among them, the method of adding the compounds (C-4) and (C-5) at the same time is preferred. The reaction between the compounds (C-4) and (C-5) is carried out in an inert hydrocarbon solvent, preferably in an aliphatic hydrocarbon solvent such as hexane or heptane. The catalyst thus obtained is used as a slurry solution with an inert hydrocarbon solvent.

Next, the compound (C-5) will be described. In the present embodiment, the compound (C-5) is a titanium compound represented by the formula 6:

(C-5):Ti(OR$^7$)$_d$X$^1_{(4-d)}$      Formula 6 wherein d represents a real number of 0 or larger and 4 or smaller; R$^7$ represents a hydrocarbon group having 1 or more and 20 or less carbon atoms; and X$^1$ represents a halogen atom.

In the formula 6, specific examples of the hydrocarbon group represented by R$^7$ include, but are not particularly limited to: aliphatic hydrocarbon groups such as methyl, ethyl, propyl, butyl, pentyl, hexyl, 2-ethylhexyl, heptyl, octyl, decyl, and allyl groups; alicyclic hydrocarbon groups such as cyclohexyl, 2-methylcyclohexyl, and cyclopentyl groups; and aromatic hydrocarbon groups such as phenyl and naphthyl groups. Among them, aliphatic hydrocarbon groups are preferred. Specific examples of the halogen represented by X$^1$ include, but are not particularly limited to, chlorine, bromine, and iodine. Among them, chlorine is preferred. One compound selected from these compounds may be used alone as the compound (C-5), or two or more compounds selected from these compounds may be used as a mixture.

The amount of the compound (C-5) used is not particularly limited and is preferably 0.01 or more and 20 or less, particularly preferably 0.05 or more and 10 or less, in terms of the molar ratio to magnesium atom contained in the carrier (C-3).

The reaction temperature for the compound (C-5) is not particularly limited and is preferably −80° C. or higher and 150° C. or lower, more preferably −40° C. or higher and 100° C. or lower.

The method for allowing the compound (C-5) to be supported by the carrier (C-3) is not particularly limited and may involve reacting an excess of the compound (C-5) with the carrier (C-3) or using a third component to efficiently support the compound (C-5). A method of achieving this supporting through the reaction between the compound (C-5) and the organic magnesium compound (C-4) is preferred.

Next, the organic metal compound component [B] will be described. The solid catalytic component can serve as a highly active catalyst for polymerization by combination with the organic metal compound component [B] The organic metal compound component [B] is also called a "promoter." The organic metal compound component [B] is preferably a compound containing a metal selected from the group consisting of groups 1, 2, 12, and 13 of the periodic system, particularly preferably an organic aluminum compound and/or an organic magnesium compound.

Compounds represented by the formula 7 are preferably used each alone or as a mixture as the organic aluminum compound:

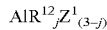  Formula 7 wherein $R^{12}$ represents a hydrocarbon group having 1 or more and 20 or less carbon atoms; $Z^1$ represents a group selected from the group consisting of hydrogen, halogen, alkoxy, allyloxy, and siloxy groups; and j represents any number of 2 or larger and 3 or smaller.

In the formula 7, specific examples of the hydrocarbon group having 1 or more and 20 or less carbon atoms, represented by $R^{12}$ include, but are not particularly limited to, aliphatic hydrocarbons, aromatic hydrocarbons, and alicyclic hydrocarbons. Preferred examples of such an organic aluminum compound include: trialkyl aluminum compounds such as trimethyl aluminum, triethyl aluminum, tripropyl aluminum, tributyl aluminum, tri(2-methylpropyl)aluminum (or triisobutyl aluminum), tripentyl aluminum, tri(3-methylbutyl)aluminum, trihexyl aluminum, trioctyl aluminum, and tridecyl aluminum; aluminum halide compounds such as diethyl aluminum chloride, ethyl aluminum dichloride, bis(2-methylpropyl)aluminum chloride, ethyl aluminum sesquichloride, and diethyl aluminum bromide; alkoxy aluminum compounds such as diethyl aluminum ethoxide and bis (2-methylpropyl)aluminum butoxide; siloxy aluminum compounds such as dimethylhydrosiloxy aluminum dimethyl, ethylmethylhydrosiloxy aluminum diethyl, and ethyldimethylsiloxy aluminum diethyl; and mixtures thereof. Among them, trialkyl aluminum compounds are particularly preferred.

The organic magnesium compound is preferably an organic magnesium compound represented by the formula 3 which is soluble in an inert hydrocarbon solvent:

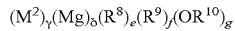  Formula 3 wherein $M^2$ represents a metal atom selected from the group consisting of groups 12, 13, and 14 of the periodic system; $R^8$, $R^9$, and $R^{10}$ each represent a hydrocarbon group having 2 or more and 20 or less carbon atoms; and γ, δ, e, f, and g each represent a real number that satisfies the following relationships: $0 \leq \gamma$, $0 < \delta$, $0 \leq e$, $0 \leq f$, $0 \leq g$, $0 < e+f$, $0 \leq g/(\gamma+\delta) \leq 2$, and $k\gamma+2\delta=e+f+g$ (wherein k represents the valence of $M^2$).

This organic magnesium compound is represented in the form of an organic magnesium complex compound soluble in an inert hydrocarbon solvent, but encompasses all of dialkyl magnesium compounds and their complexes with other metal compounds. Although γ, δ, e, f, g, $M^2$, $R^8$, $R^9$, and $OR^{10}$ are as already defined, this organic magnesium compound is preferably a compound wherein the ratio δ/γ is in the range of 0.5 to 10 and $M^2$ is aluminum because a compound having higher solubility in an inert hydrocarbon solvent is more preferred.

The method for adding the solid catalytic component and the organic metal compound component [B] into a polymerization system placed under polymerization conditions is not particularly limited. These components may be separately added into the polymerization system, or the components may be reacted in advance and then added into the polymerization system. The ratio between the components to be combined is not particularly limited and is preferably 1 mmol or higher and 3,000 mmol or lower of the organic metal compound component [B] with respect to 1 g of the solid catalytic component.

(Metallocene Catalyst)

A general transition metal compound is used in cases using the metallocene catalyst. Examples of these cases include a production method described in Japanese Patent No. 4868853. Such a metallocene catalyst is constituted by: a solid catalytic component comprising a) a transition metal compound having a cyclic η-binding anionic ligand and b) an activating agent capable of forming a complex that exerts catalytic activity through reaction with the transition metal compound; and c) a liquid component.

The transition metal compound a) having a cyclic η-binding anionic ligand used in the present embodiment can be represented by, for example, the following formula 8:

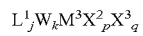  Formula 8

In the formula 8, each $L^1$ independently represents a cyclic η-binding anionic ligand selected from the group consisting of a cyclopentadienyl group, an indenyl group, a tetrahydroindenyl group, a fluorenyl group, a tetrahydrofluorenyl group, and an octahydrofluorenyl group, and this ligand optionally has 1 to 8 substituents, wherein the substituents each independently represent a substituent having up to 20 non-hydrogen atoms, selected from the group consisting of hydrocarbon groups having 1 to 20 carbon atoms, halogen atoms, halogen-substituted hydrocarbon groups having 1 to 12 carbon atoms, aminohydrocarbyl groups having 1 to 12 carbon atoms, hydrocarbyloxy groups having 1 to 12 carbon atoms, dihydrocarbylamino groups having 1 to 12 carbon atoms, hydrocarbylphosphino groups having 1 to 12 carbon atoms, a silyl group, an aminosilyl group, hydrocarbyloxysilyl groups having 1 to 12 carbon atoms, and halosilyl groups.

In the formula 8, $M^3$ represents a transition metal selected from transition metal groups belonging to group 4 of the periodic system, wherein the formal oxidation number is +2, +3, or +4, and this transition metal is bonded to at least one ligand $L^1$ via $\eta^5$ bond.

In the formula 8, W represents a divalent substituent having up to 50 non-hydrogen atoms, and this divalent substituent monovalently binds to each of $L^1$ and $M^3$ and thereby forms a metallacycle in collaboration with L and $M^3$. Each $X^2$ independently represents an anionic σ-binding type ligand having up to 60 non-hydrogen atoms, selected from a monovalent anionic σ-binding type ligand, a divalent anionic σ-binding type ligand divalently binding to $M^3$, and a divalent anionic σ-binding type ligand monovalently binding to each of $L^1$ and $M^3$.

In the formula 8, each $X^2$ independently represents a neutral Lewis base-coordinating compound having up to 40 non-hydrogen atoms, and $X^3$ represents a neutral Lewis base-coordinating compound.

j is 1 or 2 provided that when j is 2, two ligands $L^1$ are optionally bonded to each other via a divalent group having up to 20 non-hydrogen atoms, wherein the divalent group is a group selected from the group consisting of hydrocarbadiyl groups having 1 to 20 carbon atoms, halohydrocarbadiyl groups having 1 to 12 carbon atoms, hydrocarbyleneoxy groups having 1 to 12 carbon atoms, hydrocarbyleneamino groups having 1 to 12 carbon atoms, a silanediyl group, halosilanediyl groups, and a silyleneamino group.

k is 0 or 1. p is 0, 1, or 2 provided that: when $X^2$ is a monovalent anionic σ-binding type ligand or a divalent anionic σ-binding type ligand binding to $L^1$ and $M^3$, p is an integer smaller by at least 1 than the formal oxidation number of $M^3$; and when $X^2$ is a divalent anionic σ-binding type ligand binding only to $M^3$, p is an integer smaller by at least (j+1) than the formal oxidation number of $M^3$. q is 0, 1, or 2.

Examples of the ligand $X^2$ in the compound of the formula 8 include halides, hydrocarbon groups having 1 to 60 carbon atoms, hydrocarbyloxy groups having 1 to 60 carbon atoms, hydrocarbylamide groups having 1 to 60 carbon atoms, hydrocarbyl phosphide groups having 1 to 60 carbon atoms, hydrocarbyl sulfide groups having 1 to 60 carbon atoms, a silyl group, and combinations thereof.

Examples of the neutral Lewis base-coordinating compound $X^3$ in the compound of the formula 8 include phosphines, ethers, amines, olefins having 2 to 40 carbon atoms, dienes having 1 to 40 carbon atoms, and divalent groups induced from these compounds.

In the present embodiment, the transition metal compound having a cyclic η-binding anionic ligand is preferably a transition metal compound represented by the formula 8 wherein j=1. Preferred examples of the compound represented by the formula 8 wherein j=1 include compounds represented by the following formula 9:

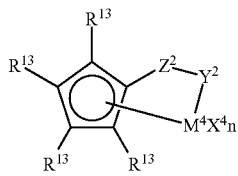

Formula 9

In the formula 9, $M^4$ represents a transition metal selected from the group consisting of titanium, zirconium, nickel, and hafnium, wherein the formal oxidation number of the transition metal is +2, +3, or +4. Each $R^{13}$ independently represents a hydrogen atom or a substituent having up to 20 non-hydrogen atoms, selected from the group consisting of hydrocarbon groups having 1 to 8 carbon atoms, a silyl group, a germyl group, a cyano group, halogen atoms, and combinations thereof provided that when the substituent $R^{13}$ is a hydrocarbon group having 1 to 8 carbon atoms, a silyl group, or a germyl group, two adjacent substituents $R^{13}$ are optionally bonded to each other to form a divalent group, which can form a ring in collaboration with the bond between two carbon atoms of the cyclopentadienyl ring bonded to these two adjacent substituents $R^{13}$, respectively.

In the formula 9, each $X^4$ independently represents a substituent having up to 20 non-hydrogen atoms, selected from the group consisting of halides, hydrocarbon groups having 1 to 20 carbon atoms, hydrocarbyloxy groups having 1 to 18 carbon atoms, hydrocarbylamino groups having 1 to 18 carbon atoms, a silyl group, hydrocarbylamide groups having 1 to 18 carbon atoms, hydrocarbyl phosphide groups having 1 to 18 carbon atoms, hydrocarbyl sulfide groups having 1 to 18 carbon atoms, and combinations thereof provided that two substituents $X^4$ can optionally form in collaboration a neutral conjugate diene having 4 to 30 carbon atoms or a divalent group.

In the formula 9, $Y^2$ represents —O—, —S—, —$NR^2$—, or —$PR^2$— wherein $R^2$ represents a hydrogen atom, a hydrocarbon group having 1 to 12 carbon atoms, a hydrocarbyloxy group having 1 to 8 carbon atoms, a silyl group, an alkyl halide group having 1 to 8 carbon atoms, an aryl halide group having 6 to 20 carbon atoms, or a combination thereof.

In the formula 9, $Z^2$ represents $SiR^3_2$, $CR^3_2$, $SiR^3_2SiR^3_2$, $CR^3_2CR^3_2$, $CR^3=CR^3$, $CR^3_2SiR^3_2$, or $GeR^3_2$ wherein $R^3$ is as defined above. n is 1, 2, or 3.

Examples of the transition metal compound having a cyclic η-binding anionic ligand used in the present embodiment include compounds as shown below. Specific examples of the zirconium compounds include, but are not particularly limited to, bis(methylcyclopentadienyl)zirconium dimethyl,
bis(n-butylcyclopentadienyl)zirconium dimethyl,
bis(indenyl)zirconium dimethyl,
bis(1,3-dimethylcyclopentadienyl)zirconium dimethyl,
(pentamethylcyclopentadienyl) (cyclopentadienyl)zirconium dimethyl,
bis(cyclopentadienyl)zirconium dimethyl,
bis(pentamethylcyclopentadienyl)zirconium dimethyl,
bis(fluorenyl)zirconium dimethyl,
ethylenebis(indenyl)zirconium dimethyl,
ethylenebis(4,5,6,7-tetrahydro-1-indenyl)zirconium dimethyl,
ethylenebis(4-methyl-1-indenyl)zirconium dimethyl,
ethylenebis(5-methyl-1-indenyl)zirconium dimethyl,
ethylenebis(6-methyl-1-indenyl)zirconium dimethyl,
ethylenebis(7-methyl-1-indenyl)zirconium dimethyl,
ethylenebis(5-methoxy-1-indenyl)zirconium dimethyl,
ethylenebis(2,3-dimethyl-1-indenyl)zirconium dimethyl,
ethylenebis(4,7-dimethyl-1-indenyl)zirconium dimethyl,
ethylenebis-(4,7-dimethoxy-1-indenyl)zirconium dimethyl,
methylenebis(cyclopentadienyl)zirconium dimethyl,
isopropylidene(cyclopentadienyl)zirconium dimethyl,
isopropylidene(cyclopentadienyl-fluorenyl)zirconium dimethyl,
silylenebis(cyclopentadienyl)zirconium dimethyl, and
dimethylsilylene(cyclopentadienyl)zirconium dimethyl.

Specific examples of the titanium compounds include, but are not particularly limited to,
[(N-t-butylamido) (tetramethyl-η5-cyclopentadienyl)-1,2-ethanediyl]titanium dimethyl,
[(N-t-butylamido) (tetramethyl-η5-cyclopentadienyl)dimethylsilane]titanium dimethyl,
[(N-methylamido) (tetramethyl-η5-cyclopentadienyl)dimethylsilane]titanium dimethyl,
[(N-phenylamido) (tetramethyl-η5-cyclopentadienyl)dimethylsilane]titanium dimethyl,
[(N-benzylamido) (tetramethyl-η5-cyclopentadienyl)dimethylsilane]titanium dimethyl,
[(N-t-butylamido) (η5-cyclopentadienyl)-1,2-ethanediyl]titanium dimethyl,

[(N-t-butylamido) (η5-cyclopentadienyl)dimethylsilane]titanium dimethyl,
[(N-methylamido) (η5-cyclopentadienyl)-1,2-ethanediyl]titanium dimethyl,
[(N-methylamido) (η5-cyclopentadienyl)dimethylsilane]titanium dimethyl,
[(N-t-butylamido) (η5-indenyl)dimethylsilane]titanium dimethyl, and
[(N-benzylamido) (η5-indenyl)dimethylsilane]titanium dimethyl.

Specific examples of the nickel compounds include, but are not particularly limited to,
dibromobistriphenylphosphine nickel,
dichlorobistriphenylphosphine nickel,
dibromodiacetonitrile nickel,
dibromodibenzonitrile nickel,
dibromo(1,2-bisdiphenylphosphinoethane)nickel,
dibromo(1,3-bisdiphenylphosphinopropane)nickel,
dibromo(1,1'-diphenylbisphosphinoferrocene)nickel,
dimethylbisdiphenylphosphine nickel,
dimethyl(1,2-bisdiphenylphosphinoethane)nickel,
methyl(1,2-bisdiphenylphosphinoethane)nickel tetrafluoroborate,
(2-diphenylphosphino-1-phenylethyleneoxy)phenylpyridine nickel,
dichlorobistriphenylphosphine palladium,
dichlorodibenzonitrile palladium,
dichlorodiacetonitrile palladium,
dichloro(1,2-bisdiphenylphosphinoethane)palladium,
bistriphenylphosphine palladium bistetrafluoroborate, and
bis(2,2'-bipyridine)methyl iron tetrafluoroborate etherate.

Specific examples of the hafnium compounds include, but are not particularly limited to,
[(N-t-butylamido) (tetramethyl-η5-cyclopentadienyl)-1,2-ethanediyl]hafnium dimethyl,
[(N-t-butylamido) (tetramethyl-η5-cyclopentadienyl)dimethylsilane]hafnium dimethyl,
[(N-methylamido) (tetramethyl-η5-cyclopentadienyl)dimethylsilane]hafnium dimethyl,
[(N-phenylamido) (tetramethyl-η5-cyclopentadienyl)dimethylsilane]hafnium dimethyl,
[(N-benzylamido) (tetramethyl-η5-cyclopentadienyl)dimethylsilane]hafnium dimethyl,
[(N-t-butylamido) (η5-cyclopentadienyl)-1,2-ethanediyl]hafnium dimethyl,
[(N-t-butylamido) (η5-cyclopentadienyl)dimethylsilane]hafnium dimethyl,
[(N-methylamido) (η5-cyclopentadienyl)-1,2-ethanediyl]hafnium dimethyl,
[(N-methylamido) (η5-cyclopentadienyl)dimethylsilane]hafnium dimethyl,
[(N-t-butylamido) (η5-indenyl)dimethylsilane]hafnium dimethyl, and
[(N-benzylamido) (η5-indenyl)dimethylsilane]hafnium dimethyl.

Specific examples of the transition metal compound having a cyclic η-binding anionic ligand used in the present embodiment further include compounds named by the replacement of the moiety "dimethyl" (which appears at the end of the name of each compound, i.e., immediately after the moiety "zirconium" or "titanium", and corresponds to the moiety of $X^4$ in the formula 9) in the name of each zirconium compound or titanium compound listed above with, for example, any of "dichloro", "dibromo", "diiodo", "diethyl", "dibutyl", "diphenyl", "dibenzyl", "2-(N,N-dimethylamino) benzyl", "2-butene-1,4-diyl", "s-trans-η4-1,4-diphenyl-1,3-butadiene", "s-trans-η4-3-methyl-1,3-pentadiene", "s-trans-η4-1,4-dibenzyl-1,3-butadiene", "s-trans-η4-2,4-hexadiene", "s-trans-η4-1,3-pentadiene", "s-trans-η4-1,4-ditolyl-1,3-butadiene", "s-trans-η4-1,4-bis(trimethylsilyl)-1,3-butadiene", "s-cis-η4-1,4-diphenyl-1,3-butadiene", "s-cis-η4-3-methyl-1,3-pentadiene", "s-cis-η4-1,4-dibenzyl-1,3-butadiene", "s-cis-η4-2,4-hexadiene", "s-cis-η4-1,3-pentadiene", "s-cis-η4-1,4-ditolyl-1,3-butadiene", and "s-cis-η4-1,4-bis(trimethylsilyl)-1,3-butadiene".

The transition metal compound having a cyclic η-binding anionic ligand used in the present embodiment can be synthesized by a method generally known in the art. In the present embodiment, these transition metal compounds may be used alone or in combination.

Next, the activating agent b) capable of forming a complex that exerts catalytic activity through reaction with the transition metal compound (hereinafter, also simply referred to as an "activating agent") used in the present embodiment will be described.

Examples of the activating agent according to the present embodiment include compounds represented by the following formula 10:

$$[L^2\text{-}H]^{d+}[M^5{}_mQ_p]^{d-} \qquad \text{Formula 10}$$

wherein $[L^2\text{-}H]^{d+}$ represents a proton-donating Bronsted acid wherein $L^2$ represents a neutral Lewis base, and d represents an integer of 1 to 7; and $[M^5{}_mQ_p]^{d-}$ represents a compatible non-coordinating anion wherein $M^5$ represents a metal belonging to any of groups 5 to 15 of the periodic system, or a metalloid, each Q is independently selected from the group consisting of hydrides, halides, dihydrocarbylamide groups having 2 to 20 carbon atoms, hydrocarbyloxy groups having 1 to 30 carbon atoms, hydrocarbon groups having 1 to 30 carbon atoms, and substituted hydrocarbon groups having 1 to 40 carbon atoms wherein the number of the halide represented by Q is 1 or less, m represents an integer of 1 to 7, p represents an integer of 2 to 14, and d is as defined above provided that p−m=d.

Specific examples of the non-coordinating anion include, but are not particularly limited to,
tetrakisphenyl borate,
tri(p-tolyl)(phenyl)borate,
tris(pentafluorophenyl) (phenyl)borate,
tris(2,4-dimethylphenyl)(hydroxyl phenyl)borate,
tris(3,5-dimethylphenyl)(phenyl)borate,
tris(3,5-di-trifluoromethylphenyl) (phenyl)borate,
tris(pentafluorophenyl) (cyclohexyl)borate,
tris(pentafluorophenyl) (naphthyl)borate,
tetrakis(pentafluorophenyl)borate,
triphenyl(hydroxyphenyl)borate,
diphenyl-di(hydroxyphenyl)borate,
triphenyl(2,4-dihydroxyphenyl)borate,
tri(p-tolyl)(hydroxyphenyl)borate,
tris(pentafluorophenyl)(hydroxyphenyl)borate,
tris(2,4-dimethylphenyl)(hydroxyphenyl)borate,
tris(3,5-dimethylphenyl)(hydroxyphenyl)borate,
tris(3,5-di-trifluoromethylphenyl) (hydroxyphenyl)borate,
tris(pentafluorophenyl)(2-hydroxyethyl)borate,
tris(pentafluorophenyl)(4-hydroxybutyl)borate,
tris(pentafluorophenyl)(4-hydroxy-cyclohexyl)borate,
tris(pentafluorophenyl)(4-(4'-hydroxyphenyl)phenyl)borate, and
tris(pentafluorophenyl)(6-hydroxy-2-naphthyl)borate.

Other preferred examples of the non-coordinating anion include borates derived from the borates listed above by the replacement of the hydroxy group with a NHR group wherein R is preferably a methyl group, an ethyl group, or a tert-butyl group.

Specific examples of the proton-donating Bronsted acid include, but are not particularly limited to: trialkyl group-substituted ammonium cations such as triethylammonium, tripropylammonium, tri(n-butyl)ammonium, trimethylammonium, tributylammonium, and tri(n-octyl)ammonium; N,N-dialkylanilinium cations such as N,N-dimethylanilinium, N,N-diethylanilinium, N,N-2,4,6-pentamethylanilinium, and N,N-dimethylbenzylanilinium; dialkylammonium cations such as di-(i-propyl)ammonium and dicyclohexylammonium; triarylphosphonium cations such as triphenylphosphonium, tri(methylphenyl)phosphonium, and tri(dimethylphenyl)phosphonium; and dimethylsulfonium, diethylsulfonium, and diphenylsulfonium.

In the present embodiment, an organic metal oxy compound having unit represented by the following formula 11 may be used as the activating agent:

  Formula 11 wherein $M^6$ represents a metal belonging to any of groups 13 to 15 of the periodic system, or a metalloid, each $R^{14}$ independently represents a hydrocarbon group having 1 to 12 carbon atoms or a substituted hydrocarbon group, n represents the valence of the metal $M^6$, and m represents an integer of 2 or larger.

As a preferred example, the activating agent of the present embodiment is, for example, an organic aluminum oxy compound comprising a unit represented by the following formula 12:

  Formula 12 wherein $R^{15}$ represents Formula 12 having 1 to 8 carbon atoms, and m represents an integer of 2 to 60.

As a more preferred example, the activating agent of the present embodiment is, for example, a methylaluminoxane comprising a unit represented by the following formula 13:

  Formula 13 wherein m represents an integer of 2 to 60.

In the present embodiment, these activating agent components may be used alone or in combination.

Next, the liquid component c) will be described. The liquid component c) may comprise the following organic metal compound:

  Formula 1 wherein $M^1$ represents a metal atom selected from the group consisting of groups 12, 13, and 14 of the periodic system; $R^2$ and $R^3$ each represent a hydrocarbon group having 2 or more and 20 or less carbon atoms; $Y^1$ represents any of alkoxy, siloxy, allyloxy, amino, amide, $—N=C—R^4$, $R^5$, $—SR^6$ (wherein $R^4$, $R^5$, and $R^6$ each represent a hydrocarbon group having 1 or more and 20 or less carbon atoms, and when c is 2, $Y^1$ moieties may be different from each other), and a β-keto acid residue; and α, β, a, b, and c each represent a real number that satisfies the following relationships: $0 \leq \alpha$, $0 < \beta$, $0 \leq$, $0 \leq b$, $0 \leq c$, $0 < a+b$, $0 \leq c/(\alpha+\beta) \leq 2$, and $n\alpha+2\beta=a+b+c$ (wherein n represents the valence of $M^1$).

The liquid component c) is also used as a scavenger for impurities or inert compounds. This component c), i.e., the liquid component, even used at a high concentration is less likely to reduce polymerization activity and can thus bring about high polymerization activity in a wide concentration range. The catalyst for olefin polymerization comprising the liquid component c) therefore has easy-to-control polymerization activity.

The concentration of the liquid component c) used in polymerization is 0.01 to 5 mmol/L, preferably 0.1 to 1 mmol/L, in terms of total concentration when the number of moles of organic metal compounds is defined as the total number of moles.

Such a catalytic component may be used as a supported catalyst in which the component is supported by a solid component. Such a solid component is not particularly limited and is specifically, for example, at least one inorganic solid material selected from: porous polymer materials such as polyethylene, polypropylene, and styrene-divinylbenzene copolymers; inorganic solid materials having an element belonging to any of groups 2, 3, 4, 13, and 14 of the periodic system, such as silica, alumina, magnesia, magnesium chloride, zirconia, titania, boron oxide, calcium oxide, zinc oxide, barium oxide, vanadium pentaoxide, chromium oxide, and thorium oxide, and mixtures thereof; and complex oxides thereof.

Specific examples of the complex oxides of silica include, but are not particularly limited to, complex oxides of silica and an element of group 2 or 13 of the periodic system, such as silica-magnesia and silica-alumina. In the present embodiment, in addition to the two catalytic components mentioned above, an organic aluminum compound can be used, if necessary, as a catalytic component. The organic aluminum compound that can be used in the present embodiment is, for example, a compound represented by the following formula 14:

  Formula 14 wherein $R^{16}$ represents an alkyl group having 1 to 12 carbon atoms or an aryl group having 6 to 20 carbon atoms, $X^5$ represents halogen, hydrogen, or an alkoxyl group, wherein the alkyl group is linear, branched, or cyclic, and n represents an integer of 1 to 3.

In this context, the organic aluminum compound may be a mixture of compounds represented by the formula 14. In the organic aluminum compound that can be used in the present embodiment, examples of $R^{16}$ in the formula include a methyl group, an ethyl group, a butyl group, an isobutyl group, a hexyl group, an octyl group, a decyl group, a phenyl group, and a tolyl group. Examples of $X^5$ in the formula include a methoxy group, an ethoxy group, a butoxy group, and chloro.

Specific examples of the organic aluminum compound that can be used in the present embodiment include, but are not particularly limited to, trimethyl aluminum, triethyl aluminum, tributyl aluminum, triisobutyl aluminum, trihexyl aluminum, trioctyl aluminum, tridecyl aluminum, diethyl aluminum hydride, dibutyl aluminum hydride, and diisobutyl aluminum hydride. Alternatively, a mixture thereof may be used. Alternative examples of the organic aluminum compound that can be used in the present embodiment include reaction products of these organic aluminums and alcohols such as methyl alcohol, ethyl alcohol, butyl alcohol, pentyl alcohol, hexyl alcohol, octyl alcohol, and decyl alcohol, for example, dimethyl methoxy aluminum, dimethyl ethoxy aluminum, and dibutyl butoxy aluminum.

Examples of the polymerization method for the polyethylene according to the present embodiment include the (co) polymerization of monomers including ethylene by a suspension polymerization or vapor-phase polymerization method. The suspension polymerization method is preferred because this method can efficiently remove polymerization heat. In the suspension polymerization method, an inert hydrocarbon vehicle can be used as a vehicle. The olefin itself can also be used as a solvent.

Specific examples of the inert hydrocarbon vehicle can include: aliphatic hydrocarbons such as propane, butane, isobutane, pentane, isopentane, hexane, heptane, octane, decane, dodecane, and kerosene; alicyclic hydrocarbons such as cyclopentane, cyclohexane, and methylcyclopentane; aromatic hydrocarbons such as benzene, toluene, and xylene; halogenated hydrocarbons such as ethyl chloride, chlorobenzene, and dichloromethane; and mixtures thereof.

In the polymerization for the polyethylene according to the present embodiment, the polymerization temperature is preferably 20° C. or higher and 100° C. or lower, more preferably 30° C. or higher and 90° C. or lower, further preferably 35° C. or higher and 80° C. or lower. The polymerization temperature equal to or higher than 20° C. accelerates the polymerization rate at which efficient production can be achieved. On the other hand, the polymerization temperature equal to or lower than 100° C. can realize continuous stable operation.

In the polymerization for the polyethylene according to the present embodiment, the polymerization pressure is preferably atmospheric pressure or higher and 2 MPa or lower, more preferably 0.1 MPa or higher and 1.5 MPa or lower, further preferably 0.2 MPa or higher and 1.0 MPa or lower, particularly preferably 0.3 MPa or higher and 1.0 MPa or lower. The polymerization reaction can be carried out by any of batch, semicontinuous, and continuous methods.

Alternatively, the polymerization may be carried out at two or more stages differing in reaction conditions. The molecular weight of the resulting polyethylene can be adjusted by the presence of hydrogen in the polymerization system or by the change of the polymerization temperature, as described in, for example, the specification of West German Patent Application Publication No. 3127133. Particularly, the addition of hydrogen as a chain transfer agent into the polymerization system is preferred because this approach can control the molecular weight within a proper range. In the case of adding hydrogen into the polymerization system, the mole fraction of the hydrogen is preferably 0 mol % or more and 30 mol % or less, more preferably 25 mol % or less, further preferably 20 mol % or less. In the present embodiment, in addition to each component as mentioned above, other components known in the art to be useful in production using ultrahigh-molecular-weight ethylene copolymerization can be included.

[Method for Producing Polyethylene Powder]

The method for producing the polyethylene powder of the present embodiment may comprise the steps of: obtaining a polyethylene by the polymerization method described above; deactivating the catalyst for olefin polymerization; and drying the obtained polyethylene powder.

As mentioned above, an aluminum compound may be used as a polymerization catalyst or promoter for the polyethylene. In the case of using such an aluminum compound, this compound may form aluminum hydroxide particles in the polymerization step for the polyethylene. This aluminum hydroxide can also be allowed to exist within ranges of particle size and amount prescribed by the present invention in the polyethylene powder to obtain the polyethylene powder of the present embodiment.

The average particle size of the aluminum hydroxide according to the present embodiment can be adjusted to smaller than 50 μm, for example, by decreasing the particle size of the aluminum hydroxide generated in the production steps including the polymerization for the polyethylene powder or by selecting the average particle size of the aluminum hydroxide to be added.

For this purpose, examples of the method for producing the polyethylene powder include:
(1) a method which involves mildly deactivating catalyst-derived active species or an excessive amount of the promoter such as alkyl aluminum;
(2) a method which involves continuously, not intermittently, deactivating catalyst-derived active species or an excessive amount of the promoter such as alkyl aluminum;
(3) a method which involves lowering the feed concentration of the promoter;
(4) a method which involves decreasing the amount of water contained in a solvent; and
(5) a method which involves decreasing the amount of water contained in ethylene, hydrogen, etc.

Hereinafter, each method will be described.

Method (1)

Specifically, the method which involves mildly deactivating catalyst-derived active species or an excessive amount of the promoter such as alkyl aluminum preferably involves mildly feeding the deactivating agent. When water, for example, is selected as the deactivating agent, a preferred method comprises spraying water in the form of steam onto the powder after the polymerization, not adding water droplets to the powder after the polymerization. More preferably, a mixed gas of water in the form of steam and an inert gas such as nitrogen is sprayed onto the powder after the polymerization. Also, milder deactivation can be achieved by spraying the deactivating agent in the form of steam or a mixed gas of the steam and an inert gas while stirring the polyethylene powder. As a result, the particle size of the generated aluminum hydroxide can be decreased.

Another method that can be used comprises treating, with an alcohol or the like, the polyethylene powder after the polymerization, followed by drying in only an inert gas such as nitrogen. Specifically, an exemplary method comprises deactivating the catalyst or the promoter used by the addition of a given amount of an alcohol (e.g., methanol or ethanol) to the polyethylene slurry after the polymerization, and separating the polyethylene powder from the solvent, followed by drying in inert gas (e.g., nitrogen) stream using a drier.

Method (2)

Examples of the method which involves continuously deactivating active species or the promoter include methods of feeding the deactivating agent in the form of steam or as a mixed gas of the steam and an inert gas at a given pressure using a pressure-regulating valve or the like, not intermittently feeding the deactivating agent. In this case, for a continuous polymerization process, a given amount of the deactivating agent is preferably fed at a given pressure to the polymer powder having a given flow rate. For a batch polymerization process, a given amount of the deactivating agent is preferably fed at a given pressure to a well stirred and mixed state of the slurry or the powder after the polymerization.

Method (3)

Examples of the method which involves lowering the feed concentration of the promoter include methods of diluting in advance the promoter reserved in a stock tank with a solvent to prepare a promoter solution having a low concentration, and methods of decreasing the flow rate of the promoter feed.

Method (4)

Examples of the method which involves decreasing the amount of water contained in a solvent include methods of passing the solvent through a molecular sieve or the like to remove or reduce water contained in the solvent.

Method (5)

Examples of the method which involves decreasing the amount of water contained in ethylene, hydrogen, etc. include methods of passing ethylene, hydrogen, etc. through a molecular sieve or the like to remove or reduce water contained therein, as in the method (4).

These methods (1) to (5) are also effective for decreasing the number of particles of the aluminum hydroxide having a minor axis of 50 μm or larger.

The aluminum hydroxide contained in the polyethylene powder of the present embodiment is mainly derived from the catalyst or the promoter mentioned above. The content of the aluminum hydroxide in the polyethylene powder can be controlled by the type of the catalyst or the promoter or the amount of the catalyst or the promoter added or by the adjustment of polymerization conditions.

Alternatively, the content of the aluminum hydroxide may be controlled by the addition of the aluminum hydroxide having an average particle size smaller than 50 μm as mentioned above.

The content of the magnesium element contained in the polyethylene powder of the present embodiment can be controlled by polymerization activity or by the amount of the promoter. For example, the amount of magnesium contained can be increased by reducing polymerization activity. Specifically, a decreased polymerization temperature, a decreased polymerization pressure, a shortened residence time, or the like is suitable for reducing the polymerization activity. Also, the amount of magnesium contained in the polyethylene powder can be increased by increasing the amount of the promoter organic magnesium used. On the other hand, the amount of the organic magnesium used can be decreased by increasing the amount of the organic aluminum used as the promoter.

The polyethylene powder of the present embodiment preferably has a small amount of a coarse powder from the viewpoint of handling and solubility in a solvent. The coarse powder can be removed using an appropriate sieve.

Particles that cannot pass through a sieve having, for example, an aperture size of 250 μm, 300 μm, 355 μm, 425 μm, 500 μm, 600 μm, 710 μm, or 850 μm that abides by the standards of JIS Z8801 can be removed as the coarse powder.

[Other Components]

The polyethylene powder of the present embodiment may be used, if necessary, in combination with various additives known in the art. Examples of thermal stabilizers include, but are not particularly limited to: heat-resistant stabilizers such as tetrakis[methylene(3,5-di-t-butyl-4-hydroxy)hydrocinnamate]methane and distearyl thiodipropionate; and weather-resistant stabilizers such as bis(2,2',6,6'-tetramethyl-4-piperidine)sebacate and 2-(2-hydroxy-t-butyl-5-methylphenyl)-5-chlorobenzotriazole. Examples of colorants include, but are not particularly limited to, inorganic Dry Colors and organic Dry Colors. Examples of lubricants, hydrogen chloride absorbers, etc. include, but are not particularly limited to, stearic acid salts known in the art, such as calcium stearate and zinc stearate.

[Use]

The polyethylene powder of the present embodiment has high productivity of continuous processing and excellent dimensional stability of a product and acid resistance. The polyethylene powder of the present embodiment can therefore be applied to various uses by various processing methods. The polyethylene powder of the present embodiment is suitable, for example, for secondary battery separators, particularly, lithium ion secondary battery separators, for fibers, for microporous membranes, or for fibers.

Specifically, a microporous membrane can be obtained by a processing method through extrusion in an extruder equipped with a T-die in a wet process using a solvent, drawing, extraction, and drying. The obtained microporous membrane can be suitably used in separators for secondary batteries typified by lithium ion secondary batteries and lead storage batteries, particularly, lithium ion secondary battery separators.

A thread can be obtained by a processing method through extrusion in the form of gel in an extruder equipped with a round die in a wet process using a solvent, drawing, extraction, and drying. This thread can be further drawn by a processing method to obtain a fiber made of the polyethylene powder. The obtained fiber can be used in fishing lines, stab-resistant gloves, ropes for ships, bulletproof vests, bulletproof covers for armored vehicles, fishing nets, sports goods, sutures, etc.

Alternatively, the powder of the present invention can also be used in a solid-phase drawing method of processing the powder in a temperature region equal to or lower than the melting point of the powder without the use of a solvent.

Also, the polyethylene powder of the present embodiment may be subjected to processing such as extrusion forming, press forming, or sinter forming. The polyethylene powder thus processed can be employed in uses in which conventional high-molecular-weight polyethylene powders are used, such as gears, rolls, curtain rails, rails for Pachinko balls, lining sheets for silos for grains or the like, coatings for imparting sliding properties to rubber products or the like, ski plate materials and ski soles, lining materials for heavy machines such as trucks and loading shovels, filters, and dust-trapping materials.

EXAMPLES

Hereinafter, the present invention will be described more specifically with reference to Examples. However, the present invention is not intended to be limited by Examples below by any means.

[Measurement Methods and Conditions]

(1) Molecular Weight (Viscosity-Average Molecular Weight: Mv)

The viscosity-average molecular weight of each polyethylene in each polyethylene powder was determined by a method given below according to ISO1628-3 (2010). First, 20 mg of the polyethylene was added into 20 mL of decalin (decahydronaphthalene) and dissolved by stirring at 150° C. for 2 hours. The falling time ($t_s$) between gauges of the solution was measured in a thermostat bath of 135° C. using Cannon-Fenske Routine Viscometer (manufactured by Shibata Scientific Technology Ltd.; Product No-100). As a blank test, the falling time ($t_b$) of decalin alone was measured without the addition of the polyethylene. Similarly, each falling time between gauges was measured at varying weights of the polyethylene. The reduced viscosity ($\eta_{sp}/C$) of the polyethylene determined according to the expression given below was plotted to draw a straight-line formula of concentration (C) (unit: g/dL) and the reduced viscosity ($\eta_{sp}/C$) of the polymer. The intrinsic viscosity ($[\eta]$) extrapolated to the concentration 0 was determined.

$$\eta_{sp}/C=(t_s/t_b-1)/0.1 \text{(unit:dL/g)}$$

Next, the viscosity-average molecular weight (Mv) was calculated from the value of the intrinsic viscosity ($[\eta]$) According to the Following Expression A:

$$Mv=(5.34\times 10^4)\times[\eta]^{1.49} \qquad \text{Expression A}$$

(2) Particle Size and Content of Aluminum Hydroxide

A 3 L glass beaker was charged with 500 mL of ethanol, which was then stirred at 200 rpm at ordinary temperature using a mechanical stirrer having polytetrafluoroethylene stirring blades of 75 mm in length and 22 mm of depth. To this beaker, 500 g of each polyethylene powder was gradually added. Stirring was continued for 10 minutes after the addition. Then, 1500 mL of chloroform was added thereto with stirring, and the mixture was further stirred for 10 minutes.

The stirring was terminated, and the beaker was left standing for 0.5 to 2.0 hours. The polyethylene powder was visually confirmed to float on the surface of the solution resulting in precipitates. The floating polyethylene powder was removed by gently scooping using a metal screen having an aperture size of 54 µm (280-mesh). Decantation was gently carried out until the amount of the solution remaining in the beaker reached approximately 50 mL to 100 mL to discard the supernatant.

The remaining solution and the precipitates were quantitatively transferred to a 200 mL glass beaker using approximately 10 mL of chloroform, and the beaker was left standing again. The supernatant was further removed by gentle decantation to adjust the amount of the solution to approximately 50 mL, followed by transfer to a separating funnel. The separating funnel was further left standing, and approximately 10 to 20 mL of a solution in a lower region was transferred to a glass screw bottle such that the whole amount of the precipitates was contained therein. In order to prevent the entrance of foreign substances into this screw bottle, the bottle was covered with a filter paper, and disposed around the clock in a draft having a ventilation system to evaporate the solvent. This was further dried in vacuum at ordinary temperature.

The whole amount of the precipitates thus recovered was applied to SEM-EDX (scanning electron microscope-energy dispersive X-ray spectrometer; manufactured by Hitachi High-Technologies Corporation; product name SU-70) to confirm that the precipitates contained Al element. In addition, the obtained SEM images were analyzed using an image analysis apparatus ("A-Zou Kun" manufactured by Asahi Kasei Engineering Corporation) to calculate the equivalent circle diameters of the particles. A 50% cumulative particle size in the distribution of small to large particle sizes was determined as the average particle size (D50).

The number of particles having a particle size of 50 µm or larger in terms of minor axis was counted from the SEM images of the precipitates.

(Identification of Aluminum Hydroxide)

Aluminum hydroxide was identified on the basis of an infrared absorption spectrum under conditions given below by the ATR method (Dura Scope (ATR crystal plate: diamond/ZnSe)). The infrared absorption spectrum of the precipitates obtained by the method described in the paragraph (2) from the polyethylene powder was measured. The precipitates were confirmed to be aluminum hydroxide provided that the measured infrared absorption spectrum substantially agreed with the infrared absorption spectrum of aluminum hydroxide (APYRAL® 40CD, manufactured by Nabaltec AG, D50=1.3 µm).

Model: IR-410 manufactured by JASCO Corporation
Resolution: 4 cm$^{-1}$
The number of scans: 32

Amount of aluminum hydroxide: each polyethylene powder was pressure-decomposed using a microwave decomposition apparatus (model ETHOS TC, manufactured by Milestone General K. K.). The aluminum element content (amount of Al) of the polyethylene powder was measured by the internal standard method using ICP-MS (inductively coupled plasma-mass spectrometer, model X Series X7, manufactured by ThermoFisher Scientific K. K., detection limit: 0.01 ppm). When the amount of Al thus measured was defined as a ppm and the content of Al(OH)$_3$ was defined as β ppm, β=α×78/27 was calculated.

(3) Magnesium Element Content (Amount of Mg)

Each polyethylene powder was pressure-decomposed using a microwave decomposition apparatus (model ETHOS TC, manufactured by Milestone General K. K.). The magnesium element content of the polyethylene powder was measured by the internal standard method using ICP-MS (inductively coupled plasma-mass spectrometer, model X Series X7, manufactured by ThermoFisher Scientific K. K., detection limit: 0.01 ppm).

(4) Productivity of Continuous Processing
(4)-1 Productivity of Continuous Processing of Membrane The air contained in each polyethylene powder was purged with nitrogen. The resulting powder was then supplied through a feeder to a twin-screw extruder in the nitrogen atmosphere. Liquid paraffin (having a kinetic viscosity of 7.59×10−5 m$^2$/s at 37.78° C.) was injected through a plunger pump to the extruder cylinder. The mixture was melt-kneaded, and the feeder and the pump were regulated such that the quantitative ratio of the liquid paraffin to the whole mixture to be extruded was 70% by mass (i.e., the polymer concentration was 30% by mass). The melt kneading conditions involved a temperature set to 200° C., the number of screw rotations of 240 rpm, and a discharge rate of 12 kg/hr.

Subsequently, the melt-kneaded product was extrusion-casted through a T-die onto a cooling roll with the surface temperature controlled to 25° C. to obtain a gel sheet having an original fabric film thickness of 1400 µm. In this operation, stainless plain-woven screens having an aperture size of 150 µm, 53 µm, or 150 µm that abided by the standards of JIS Z8801 were layered upstream of the T-die, and the resin pressure proximal thereto was measured using a pressure gauge.

The productivity of continuous processing was determined according to criteria given below. Specifically, when the resin pressure (P0) after a lapse of 1 hour into the extrusion was used as a reference and the resin pressure at a certain lapse time was defined as P, the rate of increase was defined as follows:

$$\text{Rate of increase}(\%)=(P-P0)/P0\times100$$

⊚: The rate of increase in resin pressure after 120 hours was within ±5%.

○: The rate of increase in resin pressure after 72 hours was 5% or less, and the rate of increase in resin pressure after 120 hours exceeded 5% and was 10% or less.

Δ: The rate of increase in resin pressure after 72 hours was 5% or less, and the rate of increase in resin pressure after 120 hours exceeded 10%.

x: The rate of increase in resin pressure after 72 hours exceeded 5%.

(4)-2 Productivity of Continuous Processing of Thread

The air contained in each polyethylene powder was purged with nitrogen. Liquid paraffin (having a kinetic viscosity of 7.59×10$^{-5}$ m$^2$/s at 37.78° C.) was then added to the preliminary mixing vessel such that the polymer concentration was 8% by mass. The mixture was stirred at room temperature to obtain homogeneous slurry. This slurry was supplied through a pump to a twin-screw extruder in the nitrogen atmosphere and melt-kneaded. The melt kneading conditions involved a temperature set to 250° C., the number of screw rotations of 200 rpm, and a discharge rate of 12 kg/hr.

In order to impart discharge stability to the downstream region of the extruder, stainless plain-woven screens having an aperture size of 250 µm, 106 µm, 45 µm, 106 µm, or 250 µm that abided by the standards of JIS Z8801 were layered via a gear pump. The resin pressure proximal thereto was measured using a pressure gauge. Then, the gel was processed by spinning through a die for spinning.

Then, the productivity of continuous processing was determined according to criteria given below.

Specifically, when the resin pressure (P0) after a lapse of 1 hour into the extrusion was used as a reference and the resin pressure at a certain lapse time was defined as P, the rate of increase was defined as follows:

Rate of increase(%)=(P−P0)/P0×100

⊚: The rate of increase in resin pressure after 120 hours was within ±5%.

◯: The rate of increase in resin pressure after 72 hours was 5% or less, and the rate of increase in resin pressure after 120 hours exceeded 5% and was 10% or less.

Δ: The rate of increase in resin pressure after 72 hours was 5% or less, and the rate of increase in resin pressure after 120 hours exceeded 10%.

×: The rate of increase in resin pressure after 72 hours exceeded 5%.

(5) Dimensional Stability of Product (5)-1 Film Thickness Stability

The gel sheet having an original fabric film thickness of 1400 μm, obtained in the paragraph (4)-1 was placed in a simultaneous biaxial tenter drawing machine and biaxially drawn. The drawing conditions were set to draw ratios of ×7.0 (MD) and ×7.0 (TD) (i.e., 7.0×7.0) and a biaxial drawing temperature of 125° C. Next, the gel sheet was thoroughly dipped in methyl ethyl ketone in a methyl ethyl ketone bath to extract and remove the liquid paraffin. Then, the methyl ethyl ketone was removed by drying to obtain a microporous membrane.

Next, the microporous membrane was placed in a TD tenter and heat-set at a draw ratio of ×1.4 at a temperature of 125° C., followed by relaxation operation of ×0.8 (i.e., the rate of relaxation from the heat setting was ×0.8). The film thickness thus obtained was approximately 20 μm. This membrane was cut into a TD×MD particle size of 30 cm×30 cm to obtain a microporous membrane. The film thickness of this membrane was measured at a total of 9 equally-spaced points (4 corners, 4 points at the central parts of the sides, respectively, and 1 point at the center of the membrane) using a film thickness gauge (manufactured by TECLOCK Corporation, model SM-1201). Three membranes of this size were used to measure the film thickness at a total of 27 points. Of these 27 points, when the maximum value of the film thickness was defined as T(max), the minimum value of the film thickness was defined as T(min), and the average film thickness was defined as T(ave), thickness unevenness was defined as described below. The film thickness stability was evaluated according to the following criteria:

(Thickness unevenness)(%)=(T(max)−T(min))/(2×T(ave))×100

◯: The thickness unevenness (%) was 0% or more and 2% or less.

Δ: The thickness unevenness (%) exceeded 2% and was 4% or less.

×: The thickness unevenness (%) exceeded 4%.

(5)-2 Thread Diameter Stability

The gel-spun thread obtained in the paragraph (4)-2 was used to extract the liquid paraffin from the gel-spun thread in a Soxhlet apparatus using trichlorotrifluoroethane (TCTFE) under reflux. Next, the gel-spun thread was dried in air to form a xerogel-spun thread, which was then hot-drawn at two stages (initially at 120° C. and then at 150° C.). The draw ratio was maximized at each stage of drawing the gel-spun thread and the xerogel-spun thread, and the total draw ratio was set to ×500.

The obtained thread was cut into 1 m. The thread diameter of this thread was measured at a total of 9 sites equally spaced by approximately 10 cm except for both ends using an optical microscope. A total of 4 threads of this 1 m size were used to measure the thread diameter at a total of 36 sites. When the maximum value of the thread diameter was defined as T(max), the minimum value of the thread diameter was defined as T(min), and the average thread diameter was defined as T(ave), thread diameter unevenness was defined as described below. The thread diameter stability was evaluated according to the following criteria:

(Thread diameter unevenness)(%)=(T(max)−T(min))/(2×T(ave))×100

◯: The thread diameter unevenness (%) was 0% or more and 3% or less.

Δ: The thread diameter unevenness (%) exceeded 3% and was 5% or less.

×: The thread diameter unevenness (%) exceeded 5%.

(6) Acid Resistance

For the acid resistance of a membrane, the membrane after the heat setting was cut into a size of 90 mm×5 mm and evaluated. For the acid resistance of a thread, the thread after the hot drawing of the xerogel-spun thread was cut into a length of 90 mm and evaluated in the form of a single yarn. Each sample was dipped in an aqueous solution containing 40% by mass of sulfuric acid at 80° C. for 3 days. The tensile strength of the sample was measured before and after the dipping. The acid resistance was determined according to criteria given below. The tensile test was conducted by assaying the membrane according to the standards of ISO527-3 and the thread according to the standards of ISO2062. The tensile strength before the dipping was defined as TS0, and the tensile strength after the dipping was defined as TS1.

Rate of strength retention(%)=TS1/TS0×100

◯: The rate of strength retention was 90% or more.

×: The rate of strength retention was less than 90%.

(7) Resistance to End Breakage

The thread processing was continuously carried out for 2 hours by the method described in the paragraph (4)-2. If end breakage occurred in the course of this process, the number of breakages was counted and the spinning was continued again. In this operation, the time required for start-up was excluded from the 2-hour processing time so that the total time of the continuous operation was net 2 hours. The number of end breakages was summed. This series of operations was carried out twice, and an average number of end breakages was determined. The resistance to end breakage was evaluated from the average number of end breakages according to the following criteria:

◯: The average number of end breakages was 0.

Δ: The average number of end breakages exceeded 0 and was 1.5 or less.

×: The average number of end breakages exceeded 1.5.

Example 1

Preparation of Solid Catalytic Component [A] Metallocene Catalyst (Preparation of Carrier [A-1])

Silica Q6 [manufactured by Fuji Silysia Chemical Ltd.] was used as a carrier precursor. Silica Q6 was heat-treated at 400° C. for 5 hours in the nitrogen atmosphere. The Silica Q6 thus heat-treated had a specific surface area of 480 m$^2$/g and an average particle size of 9.5 μm. The amount of hydroxy groups on the surface of the silica thus heat-treated was 1.85 mmol/g. In a 1.8 L autoclave purged with nitrogen, the heat-treated Silica Q6 (40 g) was dispersed in 800 mL of hexane to obtain slurry. While the temperature of the obtained slurry was kept at 20° C. with stirring, 80 mL of a hexane solution of triethyl aluminum (concentration: 1 mol/L) was added thereto. Then, the mixture was stirred for 2 hours to prepare 880 mL of hexane slurry of a triethyl aluminum-adsorbed carrier [A-1].

Preparation of Transition Metal Compound Component [B]

[(N-t-Butylamido) (tetramethyl-η$^5$-cyclopentadienyl) dimethylsilane]titanium-1,3-pentadiene (hereinafter, simply referred to as a "titanium complex") was dissolved at 200 mmol in 1000 mL of Isopar E [manufactured by Exxon Chemical Co., Inc.]. To this solution, 20 mL of a hexane solution of an organic magnesium compound (concentration: 1 mol/L) represented by the compositional formula AlMg$_6$(C$_2$H$_5$)$_3$(n-C$_4$H$_9$)$_{12}$ was added. The titanium complex concentration was adjusted to 0.1 mol/L by the addition of hexane to obtain a transition metal compound component [B]. The organic magnesium compound of the compositional formula AlMg$_6$(C$_2$H$_5$)$_3$(n-C$_4$H$_9$)$_{12}$ was synthesized by mixing predetermined amounts of triethyl aluminum and dibutyl magnesium at 25° C. in hexane.

Preparation of Activating Agent [C]

Bis(hydrogenated tallow alkyl)methylammonium-tris (pentafluorophenyl) (4-hydroxyphenyl) borate (hereinafter, simply referred to as a "borate") (5.7 g) was added to 50 mL of toluene and dissolved therein to obtain a 100 mmol/L toluene solution of the borate. To this toluene solution of the borate, 5 mL of a hexane solution of ethoxydiethyl aluminum (concentration: 1 mol/L) was added at 25° C. The borate concentration of the toluene solution was adjusted to 80 mmol/L by the addition of hexane. Then, the mixture was stirred at 25° C. for 1 hour to prepare an activating agent [C].

Preparation of Solid Catalytic Component [A]

To 880 mL of the slurry of the carrier [A-1] obtained by the aforementioned procedures, 50 mL of the activating agent [C] obtained by the aforementioned procedures and 40 mL of the transition metal compound component [B] obtained by the aforementioned procedures were added at the same time with stirring at 20° C. The reaction was continued for 3 hours to prepare a solid catalytic component [A].
(Liquid Component c)
To a 200 mL flask, 40 mL of hexane and an organic magnesium compound represented by AlMg$_6$(C$_2$H$_5$)$_3$(n-C$_4$H$_9$)$_{12}$ (37.8 mmol as a total sum of Mg and Al) were added, and the mixture was cooled to 0° C. Then, 40 mL of hexane containing 2.27 g of methylhydropolysiloxane (viscosity: 30 centistokes at 30° C.) was added thereto over 30 minutes. Then, the temperature was raised to 80° C., and the mixture was reacted for 2 hours with stirring to obtain a liquid component c.
(Polymerization for Polyethylene)
Hexane, ethylene, and the catalyst were continuously supplied to a vessel-type 300 L polymerization reactor equipped with a stirring apparatus. The polymerization temperature was kept at 40° C. by jacket cooling. The hexane was supplied at a rate of 40 L/hr. The solid catalytic component [A] was added at a rate of 1.0 g/hr to the polymerization reactor, and the liquid component c was added at a rate of 4 mmol/hr to the polymerization reactor. The production rate for the ethylene polymer was 10 kg/hr. The polymerization pressure was kept at 0.5 MPa by the continuous supply of ethylene. The catalytic activity was 2,000 g-PE/g-solid catalytic component [A]. The polymer slurry was continuously discharged into a flash drum having a pressure of 0.05 MPa such that the level of the polymerization reactor was kept constant to separate unreacted ethylene. The polymer slurry was continuously sent through a solvent separation step to a drying step. Stable continuous operation was successfully performed without generating polymer clumps and also without blocking the slurry-discharging piping. In the deactivation and drying steps, a mixed gas of steam and nitrogen was sprayed at a flow rate of 20 Nm$^3$/hr onto the powder after the polymerization to deactivate the catalyst and the liquid component. The obtained polyethylene powder was passed through a sieve having an aperture size of 425 μm to remove particles that failed to pass through the sieve. The polyethylene powder thus obtained was designated as PE1.

100 parts by mass of PE1, 0.3 parts by mass of pentaerythrityl-tetrakis-[3-(3,5-di-t-butyl-4-hydroxyphenyl)propionate] as an antioxidant, and 0.05 parts by mass of fine particles of aluminum hydroxide (APYRAL® 40CD, manufactured by Nabaltec AG, D50=1.3 μm) were formulated and dry-blended using a tumbler blender to obtain a polyethylene powder. This polyethylene powder was designated as PE1-1. (1) Viscosity-average molecular weight (Mv), (2) particle size and amount of aluminum hydroxide, and (3) magnesium element content were each measured for this polyethylene powder. The results are shown in Table 1. Also, precipitates recovered from PE1-1 were confirmed to contain particles having an average particle size smaller than 50 μm. The presence of particles having a minor axis of 50 μm or larger was also observed therein. As a result of examining the precipitates on the basis of an infrared absorption spectrum, the precipitates were confirmed to be aluminum hydroxide.

The amount (β) of the aluminum hydroxide measured in the paragraph (2) substantially agreed with the amount of the aluminum hydroxide added.

Also, gel spinning was carried out using PE1-1 according to the method described in the paragraph (4)-2 regarding the thread processing. The dimensional stability of a product was evaluated according to the method described in (5)-2 Thread diameter stability. Each item was evaluated according to the methods described in (6) Acid resistance and (7) Resistance to end breakage. The evaluation results are shown in Table 1.

Example 2

A polyethylene powder was obtained in the same way as in Example 1 except that 0.10 parts by mass of fine particles of aluminum hydroxide (APYRAL® 40CD, manufactured by Nabaltec AG, D50=1.3 μm) were added. The polyethylene powder thus formulated was indicated by PE1-2 in Table 1. Precipitates recovered from PE1-2 were confirmed to contain particles having an average particle size smaller than 50 μm. Evaluation was conducted in the same way as in Example 1 using PE1-2. The results are shown in Table 1.

Example 3

A polyethylene powder was obtained in the same way as in Example 1 except that 0.29 parts by mass of fine particles of aluminum hydroxide (APYRAL® 40CD, manufactured by Nabaltec AG, D50=1.3 μm) were added. The polyethylene powder thus formulated was indicated by PE1-3 in Table 1. Precipitates recovered from PE1-3 were confirmed to contain particles having an average particle size smaller than 50 μm. Evaluation was conducted in the same way as in Example 1 using PE1-3. The results are shown in Table 1.

Example 4

Preparation of Solid Catalytic Component [E]

(1) Synthesis of Carrier (E-1)

An 8 L stainless autoclave fully purged with nitrogen was charged with 1000 mL of a hexane solution containing 2 mol/L hydroxytrichlorosilane, and 2550 mL (corresponding to 2.68 mol of magnesium) of a hexane solution of an organic magnesium compound represented by the compositional formula $AlMg_5(C_4H_9)_{11}(OC_4H_9)_2$ was added dropwise thereto over 4 hours with stirring at 65° C. The reaction was continued with further stirring at 65° C. for 1 hour. After the completion of the reaction, the supernatant was removed, and the resulting solid was washed with 1800 mL of hexane four times. As a result of analyzing this solid (carrier (E-1)), 8.31 mmol of magnesium was contained per g of the solid.

(2) Preparation of Solid Catalytic Component [E]

To 1970 mL of the hexane slurry containing 110 g of the carrier (E-1), 110 mL of a hexane solution containing 1 mol/L titanium tetrachloride and 110 mL of a hexane solution containing 1 mol/L of an organic magnesium compound represented by the compositional formula $AlMg_5(C_4H_9)_{11}(OSiH)_2$ were added at the same time over 1 hour with stirring at 10° C. After the addition, the reaction was continued at 10° C. for 1 hour. After the completion of the reaction, 1100 mL of the supernatant was removed, and the resulting solid was washed with 1100 mL of hexane twice to prepare a solid catalytic component [E]. The amount of titanium contained in 1 g of this solid catalytic component [E] was 0.75 mmol.

(Polymerization for Polyethylene)

Hexane, ethylene, hydrogen, and the catalyst were continuously supplied to a vessel-type 300 L polymerization reactor equipped with a stirring apparatus. The polymerization pressure was 0.5 MPa. The polymerization temperature was kept at 83° C. by jacket cooling. The hexane was supplied at a rate of 40 L/hr. Triisobutyl aluminum and the solid catalytic component [E] were used as the promoter. The solid catalytic component [E] was added at a rate of 0.4 g/hr to the polymerization reactor, and the triisobutyl aluminum was added at a rate of 10 mmol/hr to the polymerization reactor. The production rate for the ethylene polymer was 10 kg/hr. The hydrogen was continuously supplied using a pump such that the hydrogen concentration was 5 mol % with respect to ethylene in the vapor phase. The catalytic activity was 30,000 g-PE/g-solid catalytic component [E]. The polymer slurry was continuously discharged into a flash drum having a pressure of 0.05 MPa and a temperature of 70° C. such that the level of the polymerization reactor was kept constant to separate unreacted ethylene and hydrogen.

The polymer slurry was continuously sent through a solvent separation step to a drying step such that the level of the polymerization reactor was kept constant. Stable continuous operation was successfully performed without generating polymer clumps and also without blocking the slurry-discharging piping. In the deactivation and drying steps, a mixed gas of steam and nitrogen was supplied at a flow rate of 20 $Nm^3$/hr to the powder after the polymerization to deactivate the catalyst and the liquid component. The obtained polyethylene powder was passed through a sieve having an aperture size of 425 μm to remove particles that failed to pass through the sieve. The polyethylene powder thus obtained was designated as PE2.

100 parts by mass of PE2 and 0.3 parts by mass of pentaerythrityl-tetrakis-[3-(3,5-di-t-butyl-4-hydroxyphenyl) propionate] as an antioxidant were formulated and dry-blended using a tumbler blender to obtain a polyethylene powder. This polyethylene powder was indicated by PE2-1 in Table 1. (1) Viscosity-average molecular weight (Mv), (2) particle size and content of aluminum hydroxide, and (3) magnesium element content were each measured for this polyethylene powder. The results are shown in Table 1. Also, precipitates recovered from PE2-1 were confirmed to have an average particle size smaller than 50 μm. As a result of examining the precipitates on the basis of an infrared absorption spectrum, the precipitates were confirmed to be aluminum hydroxide. The weight of the recovered precipitates was 8.6 mg. Accordingly, the content of the aluminum hydroxide in 500 g of the polyethylene powder was 17.2 ppm, which substantially agreed with the content value of the aluminum hydroxide measured by the method described in the paragraph (2).

Also, a gel sheet having an original fabric film thickness of 1400 μm was obtained using PE2-1 and evaluated for its productivity of continuous processing according to the method described in the paragraph (4)-1 regarding the continuous processing of a membrane. The thus-obtained gel sheet having an original fabric film thickness of 1400 μm was evaluated for its dimensional stability according to the method described in (5)-1 Film thickness stability and for its acid resistance according to the method described in (6) Acid resistance. The evaluation results about (5)-1 Film thickness stability and (6) Acid resistance are shown in Table 1. As for resistance to end breakage, a gel-spun thread was obtained according to the method described in the paragraph (4)-2 regarding the continuous processing of a thread and evaluated for its resistance to end breakage according to the method described in (7) Resistance to end breakage. The results are shown in Table 1.

(Availability as a Separator for Lithium Ion Secondary Batteries)

A mixed solution of ethylene carbonate:ethylmethyl carbonate=1:2 (volume ratio) containing $LiPF_6$ at a concentration of 1.0 mol/L was used as an electrolytic solution. A negative electrode used was composed mainly of artificial graphite. A positive electrode used was composed mainly of lithium-cobalt complex oxide $LiCoO_2$. The microporous membrane obtained using PE2-1 by the method described in the paragraph (4)-1 was used as each separator. The negative electrode, the microporous membrane, the positive electrode, and the microporous membrane were laminated in this order and then spirally wound 12 times to prepare an electrode plate laminate.

This electrode plate laminate was pressed into a flat plate shape at 2 MPa for 30 seconds under a temperature condition of 70° C. to obtain a wound battery. Subsequently, the prepared wound battery was inserted to the inside of an aluminum battery can. Then, an aluminum lead derived from the positive electrode was connected to the wall of the container, while a nickel lead derived from the negative electrode was connected to the terminal area at the lid of the battery can. Next, a non-aqueous electrolyte solution was injected into this battery can, and this can was hermetically sealed. The lithium ion battery thus prepared functioned as a secondary battery capable of repetitive charging and discharging. Thus, the obtained microporous membrane was successfully used as a lithium ion secondary battery separator.

Comparative Example 1

A polyethylene powder was obtained in the same way as in Example 1 except that the fine particles of aluminum hydroxide (APYRAL® 40CD, manufactured by Nabaltec AG, D50=1.3 µm) were not used. The obtained powder was indicated by PE1-4 in Table 1. Evaluation was conducted in the same way as in Example 1 using PE1-4. The evaluation results are shown in Table 1. This polyethylene powder was shown to have insufficient dimensional stability, acid resistance, and resistance to end breakage because of its insufficient aluminum hydroxide content.

Comparative Example 2

A polyethylene powder was obtained in the same way as in Example 1 except that 0.31 parts by mass of fine particles of aluminum hydroxide (APYRAL® 40CD, manufactured by Nabaltec AG, D50=1.3 µm) were added. The polyethylene powder thus formulated was indicated by PE1-5 in Table 1. Evaluation was conducted in the same way as in Example 1 using PE1-5. The evaluation results are shown in Table 1.

Comparative Example 3

A polyethylene powder PE3 was obtained in the same way as in the synthesis of PE1 except that the polymerization pressure was set to 1.0 MPa and the liquid component c was not used. The obtained polyethylene powder was indicated by PE3-1 in Table 1. Evaluation was conducted in the same way as in Example 2 except that PE3-1 was used instead of PE1-2. The evaluation results are shown in Table 1.

Comparative Example 4

A polyethylene powder PE4 was obtained in the same way as in the synthesis of PE1 except that the liquid component c was added at a rate of 10 mmol/hr to the polymerization reactor. The obtained polyethylene powder was indicated by PE4-1 in Table 1. Evaluation was conducted in the same way as in Example 2 except that PE4-1 was used instead of PE1-2. The evaluation results are shown in Table 1.

Comparative Example 5

A polyethylene powder was obtained in the same way as in Example 2 except that 0.10 parts by mass of fine particles of calcium carbonate (Escalon #2300 1.01 µm manufactured by Hayashi-Kasei Co., Ltd) were added instead of the fine particles of aluminum hydroxide. The results are shown in Table 1. The polyethylene powder thus formulated was indicated by PE1-6 in Table 1. Evaluation was conducted in the same way as in Example 2 using PE1-6. The evaluation results are shown in Table 1.

Example 5

A polyethylene powder (PE5) was obtained by the same procedures as in Example 1 except that in the deactivation and drying steps, water was fed at a flow rate of 10 mL/hr instead of using the mixed gas of steam and nitrogen. The fine particles of aluminum hydroxide and the antioxidant were further blended therewith in the same way as in Example 1 to obtain a powder which was designated as PE5-1. Results of measuring each characteristic are shown in Table 1.

Example 6

A polyethylene powder (PE6) was obtained by the same procedures as in Example 4 except that in the deactivation and drying steps, water was fed at a flow rate of 10 mL/hr instead of using the mixed gas of steam and nitrogen. The antioxidant were further blended therewith in the same way as in Example 4 to obtain a powder which was designated as PE6-1. Results of measuring each characteristic are shown in Table 1.

TABLE 1

|  | Example 1 | Example 2 | Example 3 | Example 4 | Comparative Example 1 | Comparative Example 2 |
|---|---|---|---|---|---|---|
| Polyethylene | PE1 | PE1 | PE1 | PE2 | PE1 | PE1 |
| Molecular weight | 2,900,000 | 2,900,000 | 2,900,000 | 800,000 | 2,900,000 | 2,900,000 |
| Polyethylene powder | PE1-1 | PE1-2 | PE1-3 | PE2-1 | PE1-4 | PE1-5 |
| Amount of aluminum element (ppm) | 161 | 345 | 1002 | 6 | 0.1 | 1082 |
| Amount of aluminum hydroxide having average particle size smaller than 50 µm (ppm) | 465 | 997 | 2895 | 17 | 0.3 | 3126 |
| Amount of magnesium element (ppm) | 7.0 | 6.9 | 7.0 | 5.1 | 7.0 | 7.1 |
| Amount of aluminum hydroxide having minor axis of 50 µm or larger (the number of particles) | 1 | 2 | 1 | 0 | 1 | 1 |
| Productivity of continuous processing | ⊚ | ⊚ | ○ | ⊚ | ○ | Δ |
| Dimensional stability of product | ○ | ○ | ○ | ○ | Δ | X |
| Acid resistance | ○ | ○ | ○ | ○ | X | ○ |
| Resistance to end breakage | ○ | ○ | ○ | ○ | Δ | Δ |

TABLE 1-continued

|  | Comparative Example 3 | Comparative Example 4 | Comparative Example 5 | Example 5 | Example 6 |
|---|---|---|---|---|---|
| Polyethylene | PE3 | PE4 | PE1 | PE5 | PE6 |
| Molecular weight | 2,900,000 | 2,950,000 | 2,900,000 | 2,900,000 | 800,000 |
| Polyethylene powder | PE3-1 | PE4-1 | PE1-6 | PE5-1 | PE6-1 |
| Amount of aluminum element (ppm) | 332 | 341 | 0.1 | 169 | 7 |
| Amount of aluminum hydroxide having average particle size smaller than 50 μm (ppm) | 959 | 985 | 0.3 | 488 | 20 |
| Amount of magnesium element (ppm) | 0.3 | 14.0 | 7.0 | 7.0 | 5.2 |
| Amount of aluminum hydroxide having minor axis of 50 μm or larger (the number of particles) | 2 | 2 | 1 | 9 | 14 |
| Productivity of continuous processing | ○ | ○ | ○ | Δ | X |
| Dimensional stability of product | ○ | ○ | X | ○ | ○ |
| Acid resistance | X | X | X | ○ | ○ |
| Resistance to end breakage | X | Δ | Δ | ○ | ○ |

These results demonstrated that a polyethylene powder which contains specific amount of aluminum hydroxide having a specific particle size and contains a specific amount of a magnesium element is excellent in productivity of continuous processing, excellent in resistance to end breakage, and excellent in dimensional stability of a product and acid resistance.

These results also demonstrated that formed article comprising the polyethylene powder of the present invention is suitably used as a lithium ion battery separator or as a fiber.

INDUSTRIAL APPLICABILITY

The polyethylene powder of the present invention is excellent in productivity of continuous processing, is less likely to cause the end breakage of a fiber during processing, and excellent in dimensional stability of a product and acid resistance, and as such, is very highly available in a wide range of industrial uses such as lithium ion battery separators, lead storage battery separators, and fibers.

What is claimed is:

1. A polyethylene powder comprising:
   0.5 ppm or higher and 3,000 ppm or lower of an aluminum hydroxide having an average particle size smaller than 50 μm; and
   0.5 ppm or higher and 12 ppm or lower of a magnesium element, wherein a viscosity-average molecular weight of the polyethylene powder is 100,000 or larger.

2. The polyethylene powder according to claim 1, wherein a content of the aluminum hydroxide having a minor axis of 50 μm or larger is 10 particles or less in 500 g of the polyethylene powder.

3. A microporous membrane which is obtained by forming the polyethylene powder according to claim 1.

4. A fiber which is obtained by forming the polyethylene powder according to claim 1.

5. A method for producing a polyethylene powder according to claim 1, comprising the steps of:
   polymerizing ethylene in the presence of a catalyst for olefin polymerization to obtain a polyethylene powder;
   deactivating the catalyst for olefin polymerization; and
   drying the polyethylene powder, wherein
   the step of deactivating the catalyst for olefin polymerization comprises spraying a catalyst deactivator onto the polyethylene powder.

6. The method for producing the polyethylene powder according to claim 5, wherein the catalyst deactivator is water, wherein the water is sprayed in a form of steam.

7. The method for producing the polyethylene powder according to claim 5, wherein the catalyst deactivator is water, wherein the water is sprayed in a form of steam as a mixed gas with an inert gas.

8. The polyethylene powder according to claim 1, wherein the polyethylene powder has 100 ppm or higher and 1,000 ppm or lower of the aluminum hydroxide.

9. The polyethylene powder according to claim 1, wherein the average particle size of the aluminum hydroxide is larger than 0.02 μm.

10. The polyethylene powder according to claim 1, wherein the average particle size of the aluminum hydroxide is smaller than 10 μm and larger than 0.5 μm.

11. The polyethylene powder according to claim 1, wherein the polyethylene powder has 5 ppm or higher and 6 ppm or lower of the magnesium element.

12. The polyethylene powder according to claim 1, wherein the polyethylene powder comprises ethylene homopolymers or copolymers of ethylene and olefin, wherein the olefin is at least one olefin selected from the group consisting of α-olefins having 3 to 20 carbon atoms, cyclic olefins having 3 to 20 carbon atoms, compounds represented by the formula $CH_2=CHR^1$, wherein $R^1$ is an aryl group having 6 to 20 carbon atoms, and linear, branched, or cyclic dienes having 4 to 20 carbon atoms.

13. The polyethylene powder according to claim 12, wherein the polyethylene powder comprises copolymers of ethylene and olefin, wherein the olefin is propylene or 1-butene.

14. The polyethylene powder according to claim 1, wherein the viscosity-average molecular weight of the polyethylene powder is 10,000,000 or smaller.

15. A lithium ion secondary battery separator comprising the polyethylene powder according to claim 1, wherein the viscosity-average molecular weight of the polyethylene powder is 100,000 or larger and 2,000,000 or smaller.

16. A lithium ion secondary battery separator comprising the polyethylene powder according to claim 1, wherein the viscosity-average molecular weight of the polyethylene powder is 200,000 or larger and 1,200,000 or smaller.

17. A lead storage battery separator comprising the polyethylene powder according to claim 1, wherein the viscosity-average molecular weight of the polyethylene powder is 4,000,000 or larger and 10,000,000 or smaller.

18. A lead storage battery separator comprising the polyethylene powder according to claim 1, wherein the viscosity-average molecular weight of the polyethylene powder is 6,000,000 or larger and 8,000,000 or smaller.

19. The fiber according to claim 4, wherein the viscosity-average molecular weight of the polyethylene powder is 1,500,000 or larger and 10,000,000 or smaller.

20. The fiber according to claim 4, wherein the viscosity-average molecular weight of the polyethylene powder is 4,000,000 or larger and 8,000,000 or smaller.

* * * * *